United States Patent
Nelson et al.

(10) Patent No.: US 10,431,188 B1
(45) Date of Patent: Oct. 1, 2019

(54) ORGANIZATION OF PERSONALIZED CONTENT

(71) Applicant: Amazon Technologies, Inc., Seattle, WA (US)

(72) Inventors: Thomas Irvine Nelson, Seattle, WA (US); Richard Leigh Mains, Edmonds, WA (US); Timothy Thomas Gray, Seattle, WA (US); Jae Pum Park, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 21 days.

(21) Appl. No.: 15/241,175

(22) Filed: Aug. 19, 2016

(51) Int. Cl.
| | |
|---|---|
| G09G 5/36 | (2006.01) |
| G06Q 10/08 | (2012.01) |
| G10L 15/22 | (2006.01) |
| G10L 13/04 | (2013.01) |
| G06F 3/041 | (2006.01) |
| G06Q 10/10 | (2012.01) |

(52) U.S. Cl.
CPC ......... *G09G 5/363* (2013.01); *G06Q 10/0833* (2013.01); *G06F 3/041* (2013.01); *G06Q 10/107* (2013.01); *G06Q 10/109* (2013.01); *G09G 2354/00* (2013.01); *G10L 13/043* (2013.01); *G10L 15/22* (2013.01); *G10L 2015/223* (2013.01)

(58) Field of Classification Search
CPC ........... G06F 17/30867; G06F 17/3087; G06F 3/041; G09G 5/363; G09G 2354/00; G06Q 10/0833; G06Q 10/107; G06Q 10/109; G10L 13/043; G10L 15/22; G10L 2015/223

See application file for complete search history.

(56) References Cited

U.S. PATENT DOCUMENTS

| | | | | |
|---|---|---|---|---|
| 4,243,984 A | * | 1/1981 | Ackley | G09G 5/42 345/22 |
| 7,092,870 B1 | * | 8/2006 | Chen | G06F 17/2755 382/181 |
| 2003/0058248 A1 | * | 3/2003 | Hochmuth | H04N 21/23406 345/537 |
| 2003/0160780 A1 | * | 8/2003 | Lefebvre | G06T 15/005 345/419 |

(Continued)

*Primary Examiner* — King Y Poon
*Assistant Examiner* — Vincent Peren
(74) *Attorney, Agent, or Firm* — Pierce Atwood LLP

(57) ABSTRACT

A system that generates a personalized content grouped by type and ordered by relevancy. The system determines relevant data for individual feature groups, determines first feature groups that have relevant data to display and displays a page of content for each of the first feature groups. For example, a first page of content may indicate a clock, temperature, weather forecast or timer, a second page of content may correspond to communications and indicate a recent message, a third page of content may correspond to a calendar and may indicate an upcoming event, a fourth page of content may correspond to shipping notifications and may indicate an upcoming shipment, a fifth page of content may correspond to contacts and may indicate an available favorite contact and a sixth page of content may correspond to trending news. The device may generate synthesized speech corresponding to the display of content.

16 Claims, 19 Drawing Sheets

(56) References Cited

U.S. PATENT DOCUMENTS

| | | | | |
|---|---|---|---|---|
| 2004/0212587 A1* | 10/2004 | Kong | ............... | G06F 3/0317 |
| | | | | 345/156 |
| 2005/0034147 A1* | 2/2005 | Best, Jr. | ............ | H04L 67/24 |
| | | | | 725/10 |
| 2012/0131020 A1* | 5/2012 | Nitz | ............ | G06F 17/2785 |
| | | | | 707/749 |
| 2015/0339049 A1* | 11/2015 | Kasemset | ............ | G06F 3/04883 |
| | | | | 715/728 |
| 2016/0012017 A1* | 1/2016 | Kuan | ............ | G06F 17/212 |
| | | | | 715/273 |
| 2016/0154537 A1* | 6/2016 | Lee | ............ | G06F 3/0481 |
| | | | | 715/781 |

* cited by examiner

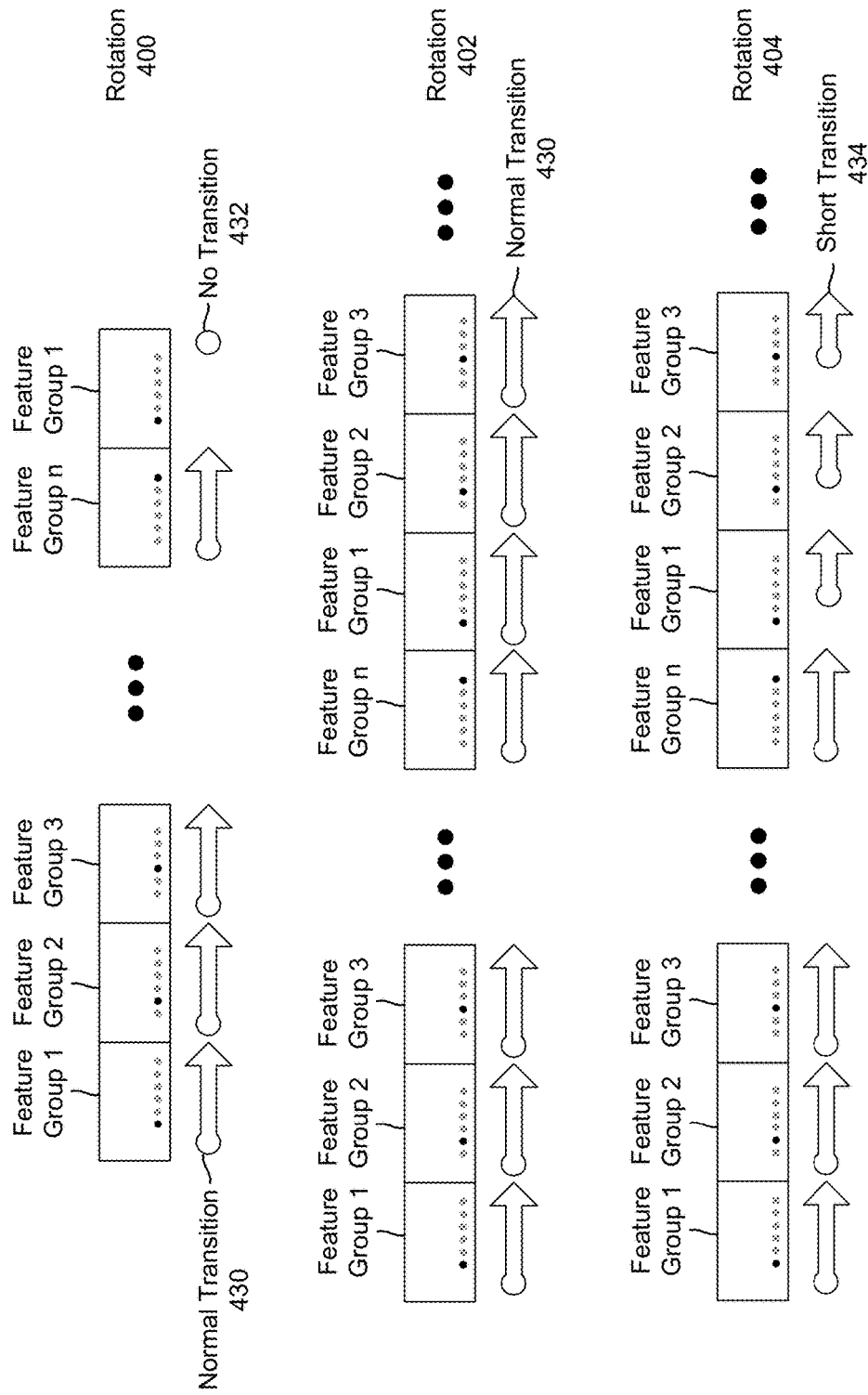

FIG. 7

Day Theme 710

I will be late for dinner
from John Doe 37 minutes ago
+3 more conversations

*Try "<Wakeword>, what are my messages?"*

Night Theme 712

I will be late for dinner
from John Doe 37 minutes ago
+3 more conversations

*Try "<Wakeword>, what are my messages?"*

Photo Theme 714

I will be late for dinner
from John Doe 37 minutes ago
+3 more conversations

*Try "<Wakeword>, what are my messages?"*

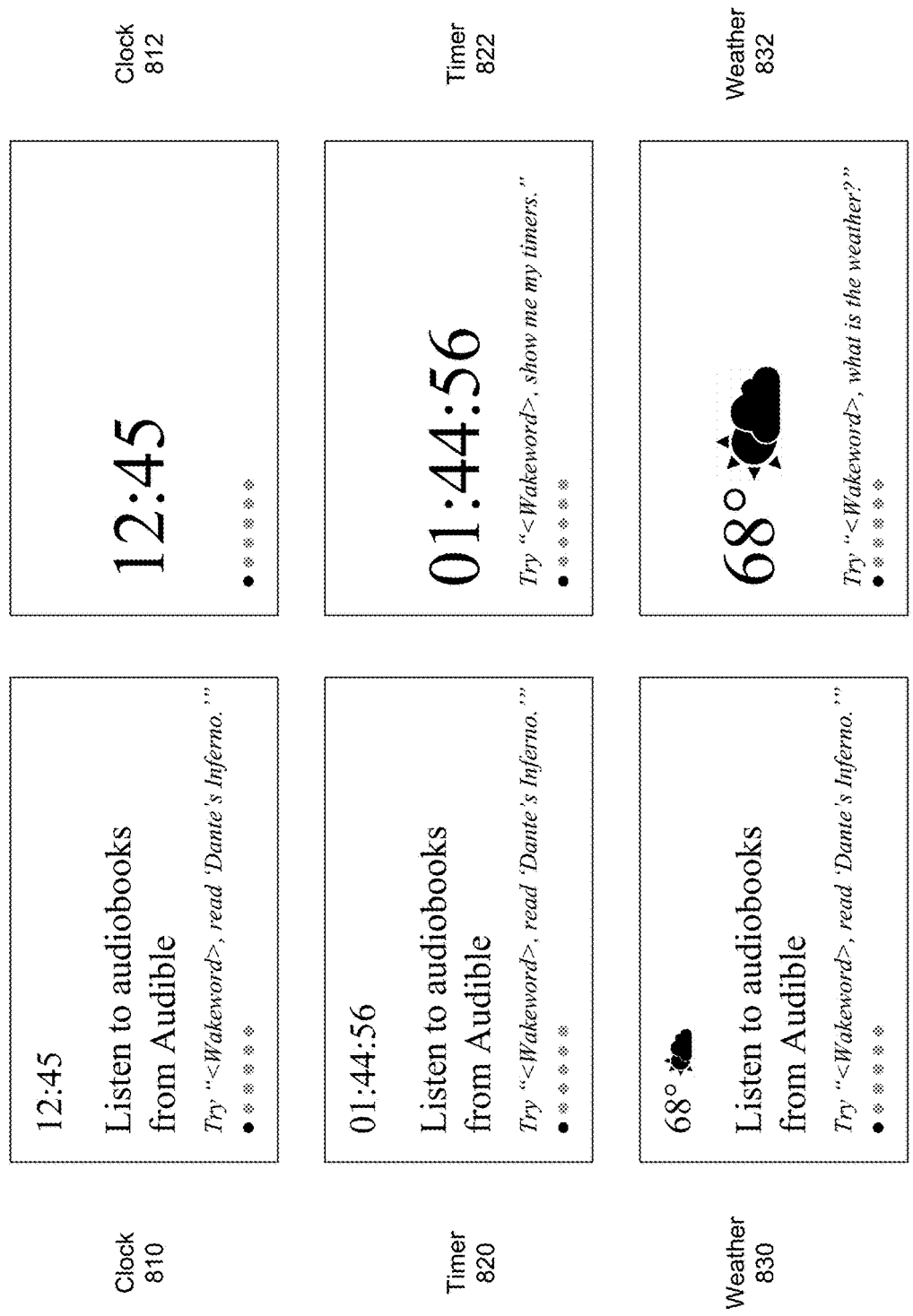

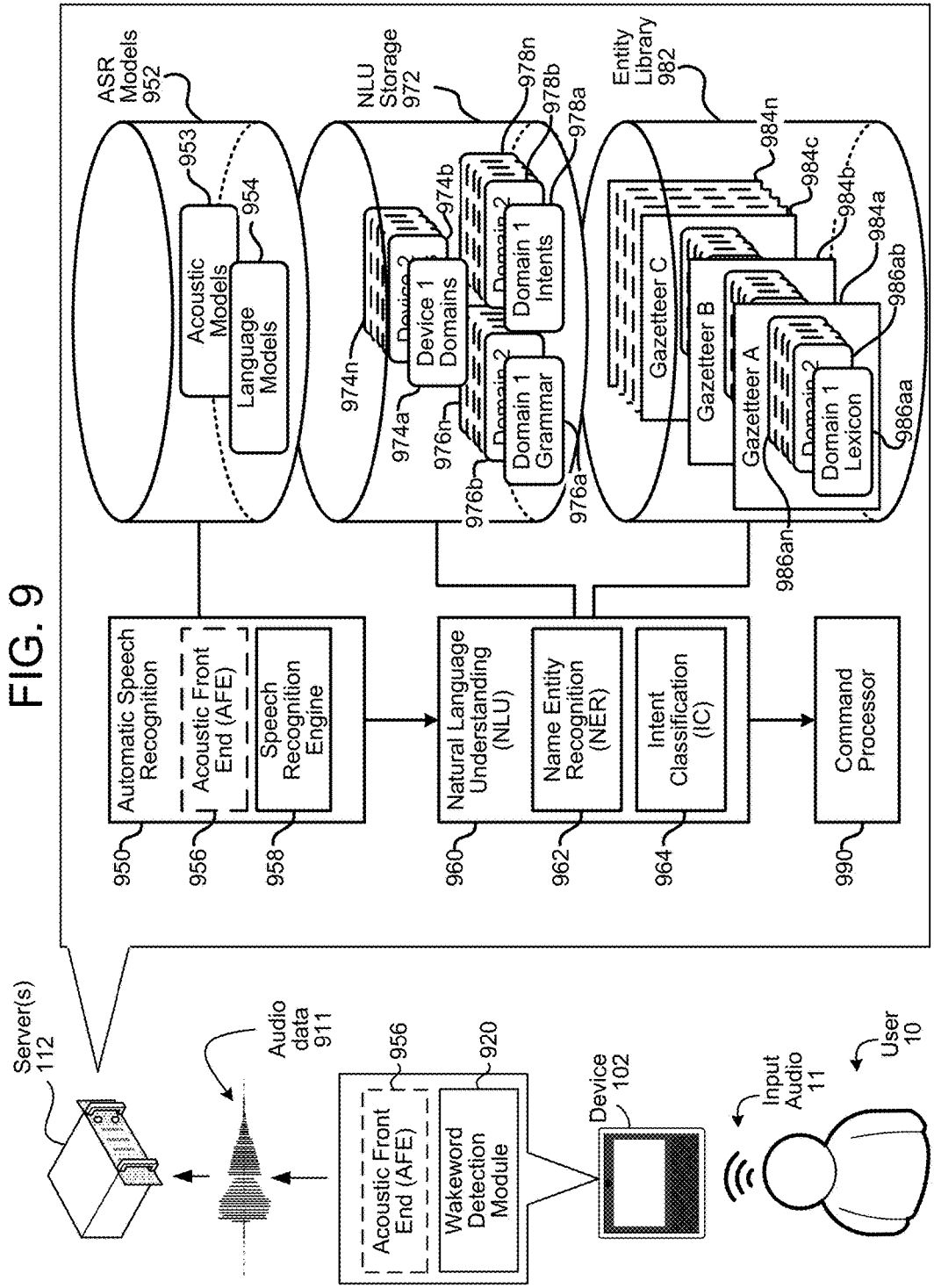

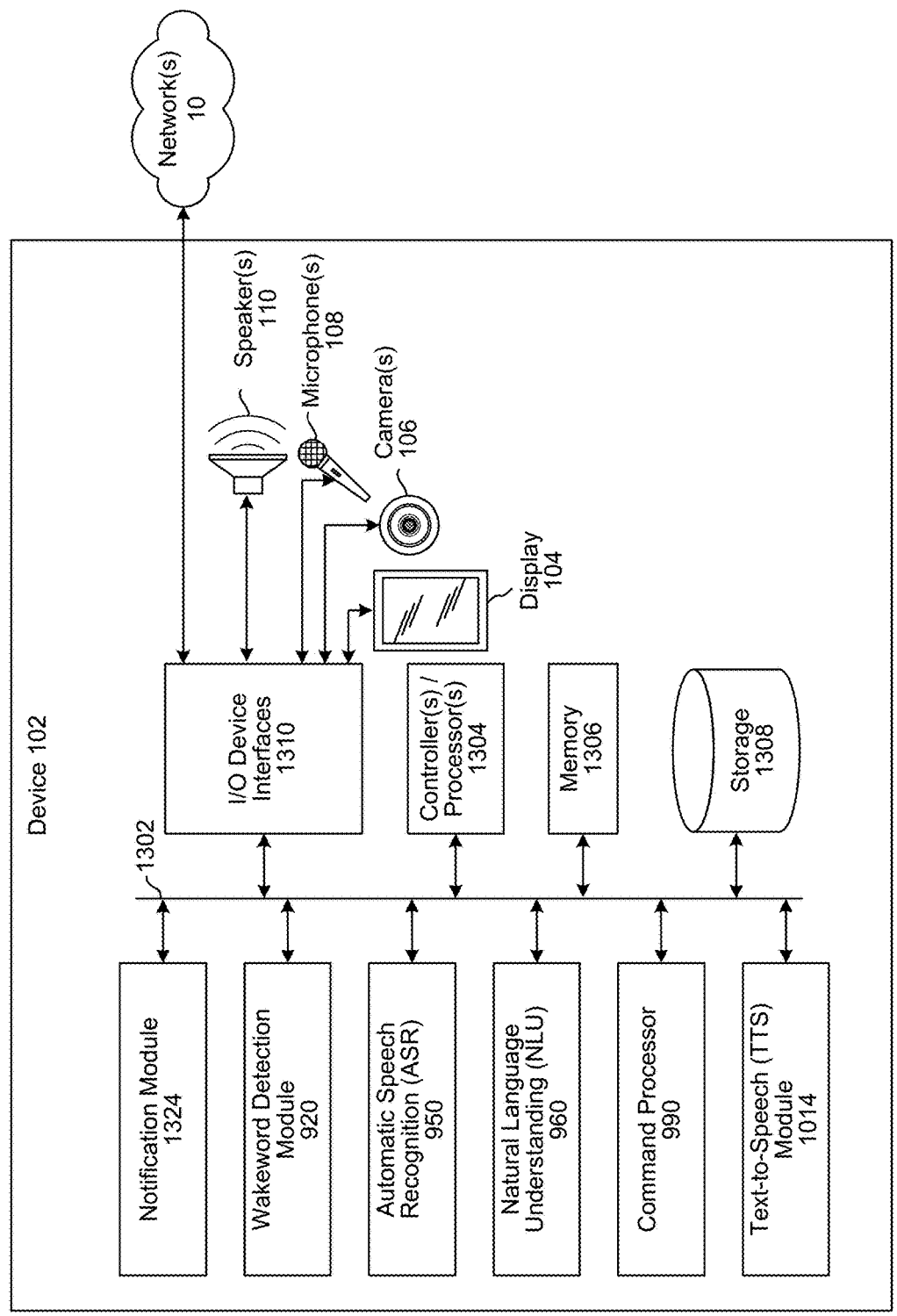

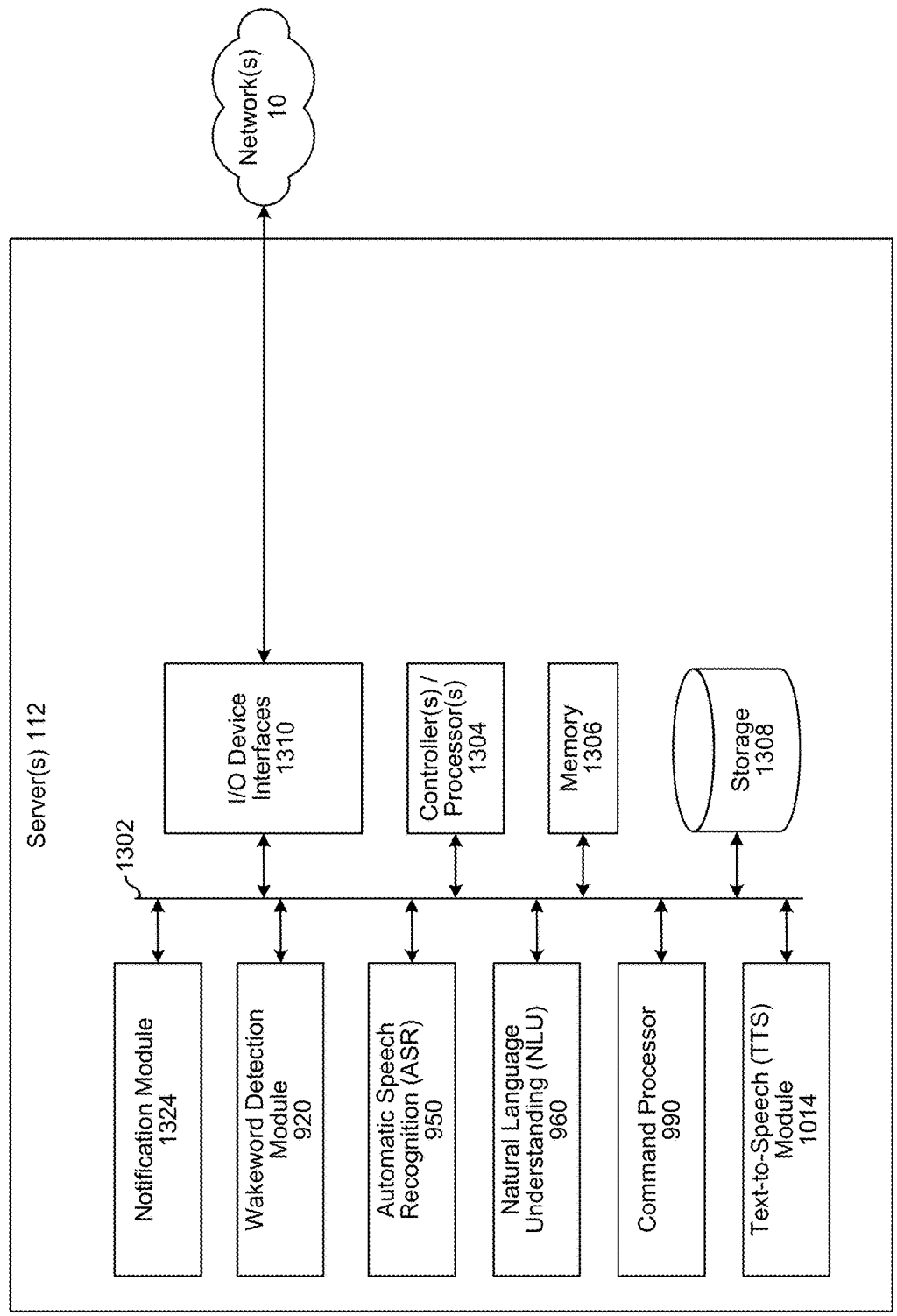

ial ly US 10,431,188 B1

ORGANIZATION OF PERSONALIZED CONTENT

BACKGROUND

With the advancement of technology, the use and popularity of electronic devices has increased considerably. Electronic devices are commonly used to stay connected and organized. Disclosed herein are technical solutions to improve a user experience when staying connected and/or organized.

BRIEF DESCRIPTION OF DRAWINGS

For a more complete understanding of the present disclosure, reference is now made to the following description taken in conjunction with the accompanying drawings.

FIGS. 4A-4C illustrate examples of transition timing according to embodiments of the present disclosure.

FIG. 7 illustrates examples of display themes according to embodiments of the present disclosure.

FIGS. 8A-8B illustrate examples of display features according to embodiments of the present disclosure.

FIG. 9 is a conceptual diagram of how a spoken utterance is processed according to examples of the present disclosure.

FIGS. 13A-13B is a block diagram conceptually illustrating example components of a system for echo cancellation according to embodiments of the present disclosure.

DETAILED DESCRIPTION

Figure 1:
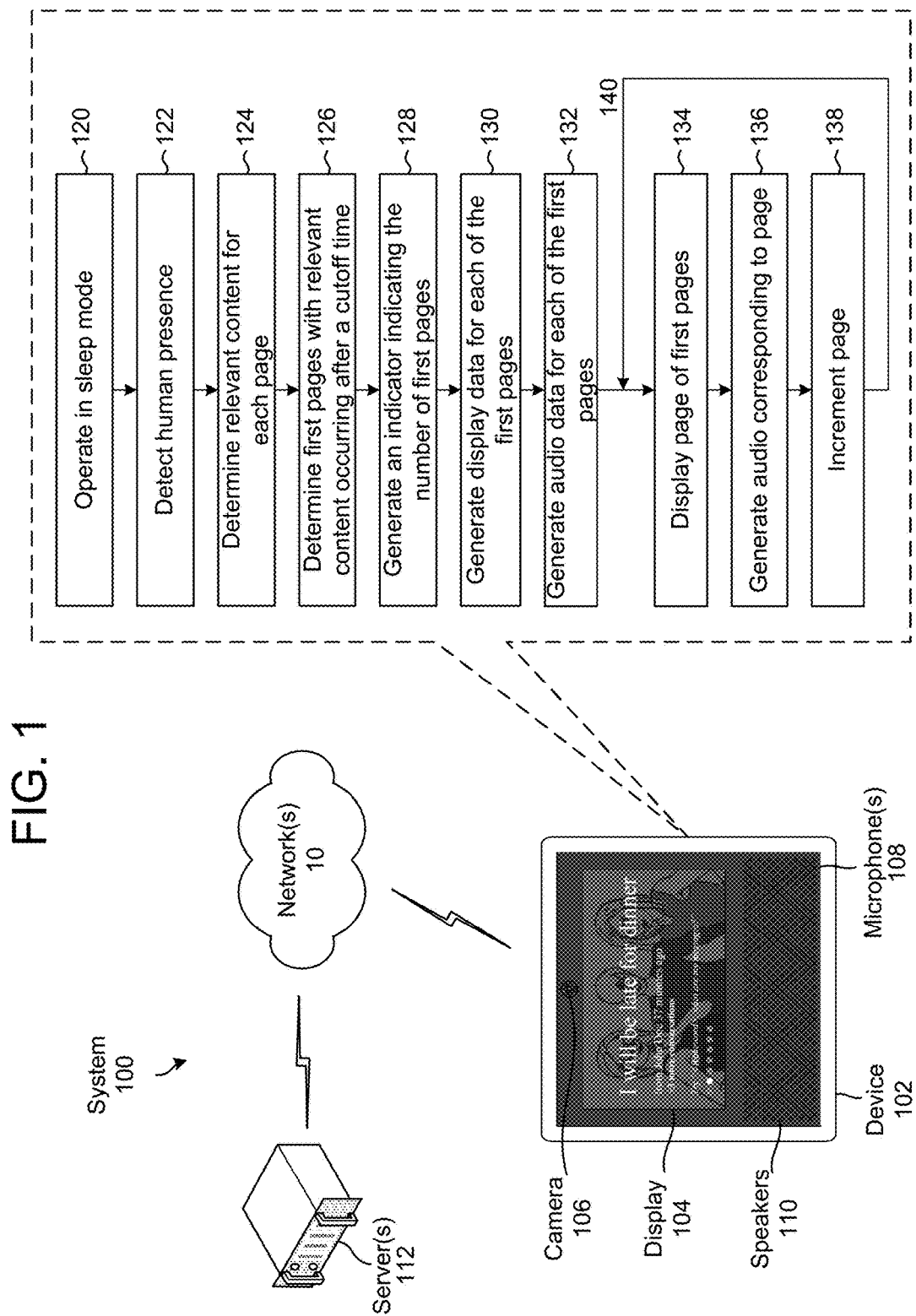
FIG. 1 illustrates a system according to embodiments of the present disclosure.

Electronic devices are commonly used to enable a user to stay connected and organized. For example, a device may be capable of receiving communications via messages (e.g., short message service (SMS) messages, messaging applications, social networking applications, or the like), emails, telephone calls or the like, calendar information including personal events (e.g., calendar events input by the user), information about group events (e.g., calendar events input by friends and family of the user), information public events (e.g., holidays, sporting events, concerts, etc.) or the like, and may receive additional notifications and information to display to the user. However, displaying this content to the user may be done individually for each application, which may result in a cluttered user interface. For example, the device may receive communications and other content corresponding to four different applications and may display four different notifications to the user. In addition to the user interface being cluttered, the device may not indicate an order that the content was received or organize it in a manner optimized for viewing from a distance.

To improve such user interfaces, devices, systems and methods are disclosed that generate personalized content that is grouped by type and ordered by relevancy. For example, the device can connect to a server to receive data (e.g., messages, calendar information, notifications, news information or the like) and may separate the data into content categories (e.g., feature groups). For each feature group, the device can determine relevant data based on multiple factors, such as a time associated with receiving the data, time associated with the data itself, an identity of a user, user preferences or the like. For example, the time associated with receiving the data may be relevant for first data (e.g., messages, notifications, news information or the like that were recently received), the time associated with the data itself may be relevant for second data (e.g., calendar information, notifications or the like regarding events that will occur in the near future) and time may not be relevant for third data (e.g., to-do lists, shopping lists, etc.). Based on the relevant data, the device may generate pages of content showing the relevant data for each feature group. The device may then cycle through displaying the pages of content and can optionally generate synthesized speech corresponding to the pages of content as they are displayed. The device may accept voice commands to control the pages of content displayed by the device and/or to show more information regarding a selected feature group.

As an example, a first page of content may correspond to a first feature group (e.g., general information) and may indicate a clock, temperature, weather forecast, timer or the like, a second page of content may correspond to a second feature group (e.g., communications) and may indicate a most recent message from amongst multiple messaging applications, a third page of content may correspond to a third feature group (e.g., a calendar) and may indicate an upcoming event, a fourth page of content may correspond to a fourth feature group (e.g., shipping notifications) and may indicate an upcoming shipment, a fifth page of content may correspond to a fifth feature group (e.g., contacts) and may indicate a favorite contact that is available and a sixth page of content may correspond to a sixth feature group (e.g., trending news) and may indicate a news story. Thus, each of the different pages of content groups notifications and information to display to the user by category, instead of individual application, and may be ordered based on most relevant content within the category. In addition, the device may generate synthesized speech that reads the content to the user as the content is displayed. Thus, the synthesized speech, when generated, may be synchronized to display of the personalized content.

FIG. 1 illustrates a high-level conceptual block diagram of a system 100 for generating and displaying content to a user. As illustrated in FIG. 1, the system 100 may include server(s) 112 communicatively coupled to a device 102 via network(s) 10. The device 102 may include a display 104, a camera 106, microphone(s) 108 and/or speakers 110. Using the camera 106 and/or the microphone(s) 108, the device 102 may detect whether a person is in proximity to the device and/or a distance to the person. For example, the device 102 may capture image data using the camera 106 and may identify a person represented in the image data. Additionally or alternatively, the device 102 may capture audio data using the microphone(s) 108 and may identify a person represented in the audio data, such as recognizing a voice, sound of breathing or the like. The device 102 may detect the presence of a person using any other techniques known to one of skill in the art and may use components not illustrated in FIG. 1 without departing from the disclosure. For example, the device 102 may detect the presence of the person based on sensor data (e.g., motion detectors, vibration detectors or the like), detecting a mobile device associated with the person, or other techniques. Using the display 104 and/or the speakers 110, the device 102 may output content to the user. For example, the device 102 may output images on the display 104 and/or voice output using the speakers 110 such that the user may see a visual depiction of the content while hearing synthesized speech synchronized to the visual depiction.

The device 102 may receive communications via messages (e.g., short message service (SMS) messages, messaging applications, social networking applications, or the like), emails, telephone calls or the like, may receive calendar information including personal events (e.g., calendar events input by the user), group events (e.g., calendar events input by friends and family of the user), public events (e.g., holidays, sporting events, concerts, etc.) or the like, and may receive additional notifications and information to display to the user, which collectively is referred to as "data" hereinafter.

The content output to the user may include a portion of the data received by the device 102. For example, the device 102 may separate the data into pages of content (e.g., individual feature groups), may identify relevant data for each page of content and may display the relevant data to the user. The device 102 may generate personalized pages of content depending on whether there is relevant content to display for each feature group. For example, if the device 102 has not received messages for a duration of time and all received messages have been read, the device 102 may skip a page of content corresponding to messaging.

For each feature group, the device 102 may determine relevant data based on multiple factors, such as a time associated with receiving the data, time associated with the data itself, an identity of a user, a number of users in proximity to the device 102, user preferences or the like. For example, the time associated with receiving the data may be relevant for first data (e.g., messages, notifications, news information or the like that were recently received), the time associated with the data itself may be relevant for second data (e.g., calendar information, notifications or the like regarding events that will occur in the near future) and time may not be relevant for third data (e.g., to-do lists, shopping lists, etc.). The device 102 may determine user(s) in proximity to the device 102, an identity corresponding to each of the user(s) and other information using techniques known to one of skill in the art. Based on the number of user(s), the identity of the user(s), user preferences associated with each of the users and other information, the device 102 may analyze information about the data (e.g., time associated with receiving the data, time associated with the data itself, etc.), to determine the relevant data associated with each of the feature groups.

A page of content may correspond to display data to display content on the display 104. The display data may be generated locally on the device 102 and/or remotely on the server(s) 112. For example, the server(s) 112 may generate program code (e.g., using Hypertext Markup Language (HTML) or the like) and send the program code to the device 102 to render the display. The device 102 may render the display (e.g., generate the display data) using a local graphics processing unit (GPU), a webview application or other techniques known to one of skill in the art.

In some examples, the device 102 may generate synthesized speech associated with individual pages of content and may synchronize audio output corresponding to the synthesized speech to the display of the pages of content. Thus, the device 102 may output first synthesized speech when displaying a first page of content, second synthesized speech when displaying a second page of content, and so on. However, the disclosure is not limited thereto and the device 102 may display the pages of content without outputting audio corresponding to synthesized speech.

While the examples described herein illustrate the device 102 performing multiple functions, the disclosure is not limited thereto. Instead, the server(s) 112 may perform any of the functions described herein without departing from the disclosure. For example, the server(s) 112 may assist the device 102 with Automatic Speech Recognition (ASR) processing, Natural Language Understanding (NLU) processing, command processing, determining relevant content, generating display data and/or generating synthesized speech. A single server 112 may be capable of performing all speech processing or multiple server(s) 112 may combine to perform the speech processing. In addition, certain speech detection or command execution functions may be performed by device 102. Thus, the device 102 and/or the server(s) 112 may perform the functions described herein without departing from the disclosure. In a first example, the device 102 may determine relevant data, generate display data corresponding to the relevant data and generate synthesized speech corresponding to the display data. In a second example, the server(s) 112 may determine the relevant data, generate the display data, generate the synthesized speech, cause the display data to be displayed and/or cause audio corresponding to the synthesized speech to be output. Thus, the device 102 may receive the relevant data, the display data and/or the synthesized speech from the server(s) 112 and display the display data and/or output the audio.

As illustrated in FIG. 1, when the device 102 doesn't detect a human in proximity for a period of time, the device 102 may operate (120) in a sleep mode with the display 104 dimmed and/or powered off. The device 102 may detect (122) human presence using techniques known to one of skill in the art, such as identifying a user (e.g., person) represented in image data captured by the camera 106, detecting a wakeword and/or noises associated with a person in audio data captured by the microphone(s) 108, based on sensor data, proximity of a mobile device associated with the user or the like. For example, when a person enters a view of the camera 106 the device 102 may identify the person using computer vision algorithms (e.g., human-detection algorithms, facial recognition algorithms, etc.) or the like. In response to detecting the human presence, the device 102 may enter a display mode and display pages of content.

The device 102 may determine (124) relevant content for each page, determine (126) first pages with relevant content occurring after a cutoff time, generate (128) an indicator indicating the number of first pages, generate (130) display data for each of the first pages and generate (132) audio data for each of the first pages. The device 102 may display (134) a page of the first pages, generate (136) audio corresponding to the page being displayed and increment (138) the page before looping (140) to step 134 and performing steps 134-138 for each of the first pages. In some examples, the device 102 may continue to increment the pages and transitioning between each of the first pages, although the disclosure is not limited thereto. Instead, the device 102 may increment the pages to display each of the first pages once before displaying a single page for a period of time.

Figure 2:
FIG. 2 illustrates examples of displaying pages of content according to embodiments of the present disclosure.

FIG. 2 illustrates examples of displaying pages of content according to embodiments of the present disclosure. As illustrated in FIG. 2, the device 102 may display a number of pages of content, including a first page corresponding to Feature Group 1 (e.g., General Information 220), a second page corresponding to Feature Group 2 (e.g., Communications 221), a third page corresponding to Feature Group 3 (e.g., Calendar 222), a fourth page corresponding to Feature Group 4 (e.g., Notifications 223), a fifth page corresponding to Feature Group 5 (e.g., Contacts 224), and a sixth page corresponding to Feature Group 6 (e.g., Trending News 225).

As part of displaying a page of content, the device 102 may display an indicator indicating a position of the page of content in the sequence of pages of content. For example, the indicator may visually indicate that a first page of content is first in a sequence of six total pages of content, that a second page of content is second in the sequence, and so on. While FIG. 2 illustrates six pages of content, the number of pages of content displayed by the device 102 may vary and the disclosure is not limited thereto. Instead, the device 102 may display any number of pages of content based on user preferences, account settings, relevant data or the like.

Additionally or alternatively, as part of displaying the page of content the device 102 may display an instruction indicating a voice command associated with the page of content. In some examples, the device 102 may display a "wakeword" and a voice command (e.g., instruction) that instructs the device 102 to display additional information associated with the page of content. For example, a voice command displayed for Feature Group 2 (e.g., Communications 221) may instruct the device 102 to display additional messages, to open an application or process on the device 102 corresponding to messages, perform additional actions or the like. An application or process may comprise processor-executable instructions to be executed by processor(s) (e.g., software, firmware, hardware, or some combination thereof) of the device 102. For example, the device 102 may run a software application/process in the foreground and/or background on the device 102.

The wakeword may be an indication to the device 102 that a user intends to speak a voice command to the device 102, as described in greater detail below with regard to FIG. 9. For example, the device 102 may convert audio into audio data using the microphone(s) 108 and process the audio data to determine whether speech is detected in the audio. If speech is detected in the audio, the device 102 may determine if the audio data comprising speech matches an audio signature and/or model corresponding to a particular keyword. Once speech is detected in the audio data, the device 102 may perform wakeword detection to determine when a user intends to speak a command to the device 102. This process may also be referred to as keyword detection, with the wakeword being a specific example of a keyword. Thus, the wakeword may vary based on user preferences, account settings, device settings or the like, and is illustrated in the drawings as <Wakeword>.

The first page of content corresponding to Feature Group 1 (e.g., General Information 220) may display various content and does not need to be specific to the user. For example, FIG. 2 illustrates the first page displaying content (e.g., "Listen to audiobooks from Audible") along with an instruction associated with the content (e.g., "Try '<Wakeword>, read Dante's Inferno"). Thus, the first page of content may include advertising, recommended purchases, recommended applications, recommended content or other targeted messages based on an identity of the user, user preferences, device settings, account settings or the like. However, the content displayed on the first page may be specific to the user or may be based on user preferences. For example, the first page may include weather information or other information requested by the user, as discussed in greater detail below with regard to FIGS. 8A-8B.

The second page of content corresponding to Feature Group 2 (e.g., Communications 221) may display recent communications received by the device 102. For example, the device 102 may receive communications via messages (e.g., short message service (SMS) messages, messaging applications, social networking applications, or the like), emails, telephone calls or the like. The device 102 may identify and display the most recent message received by the device (e.g., "'I will be late for dinner' from John Doe 37 minutes ago"), along with an indication of other recent messages (e.g., "+3 more conversations") and an instruction to see more messages (e.g., "Try '<Wakeword>, what are my messages?'"). Thus, the user may be made aware of the most recent communications along with the instruction to interact with the messages functionality of the device 102 to learn more information.

The third page of content corresponding to Feature Group 3 (e.g., Calendar 222) may display upcoming events in a calendar associated with the device 102. For example, the device 102 may receive calendar information including personal events (e.g., calendar events input by the user), group events (e.g., calendar events input by friends and family of the user), public events (e.g., holidays, sporting events, concerts, etc.) or the like. The device 102 may generate a calendar based on the calendar information and may display an upcoming event to the user (e.g., "Dinner with Leslie at 6:30 PM at Conundrum"), along with an indication of other calendar events (e.g., "+2 upcoming events") and an instruction to see more calendar information (e.g., "Try '<Wakeword>, what's on my calendar?'"). Thus, the device 102 may display relevant content associated with the calendar on the third page of content along with the instruction to interact with the calendar functionality of the device 102 to learn more information. While the calendar may include group events and/or public events, in some examples the device 102 may only select personal events to display as an upcoming event to the user.

The fourth page of content corresponding to Feature Group 4 (e.g., Notifications 223) may display relevant notifications received by the device 102. For example, the device 102 may receive shipping notifications associated with purchases made by the user and may display a relevant shipping notification to the user (e.g., most recently ordered, most recently shipped, upcoming delivery, etc.). As illustrated in FIG. 2, the fourth page of content may display the most relevant shipping notification (e.g., "A package will be delivered by 8:00 PM"), an indication of other notifications (e.g., +4 more notifications") and an instruction to see more notifications (e.g., "Try '<Wakeword>, what are my notifications?'"). Additionally or alternatively, the notification page 216 may include other information associated with the user, the device 102, a location of the device 102 or the like, such as user created reminders, weather alerts, weather forecasts, etc.

The fifth page of content corresponding to Feature Group 5 (e.g., Contacts 224) may display one or more available contacts from a contact list accessible to the device 102. For example, the device 102 may store a contact list and/or may access a contact list associated with the user and may identify favorite contacts based on a frequency of interaction, user preference or other techniques known to one of skill in the art. The device 102 may select an available contact having the most frequent interaction or otherwise most popular to the user and may display the available contact on the fifth page of content (e.g., "John Doe is available") along with an indication of other contacts (e.g., "+3 more friends") and an instruction to see more contacts (e.g., "Try '<Wakeword>, who's available?'"). While the fifth page of content illustrated in FIG. 2 includes a single contact, the disclosure is not limited thereto and the fifth page of content may display multiple contacts simultaneously without departing from the disclosure. The device 102 may determine the most popular contacts based on user preferences, user history, user input (e.g., selecting immediate family, close friends or the like) or other techniques known to one of skill in the art.

The sixth page of content corresponding to Feature Group 6 (e.g., Trending News 225) may display one or more trending news stories or other public information accessible by the device 102. For example, the device 102 may update the sixth page of content periodically to display a news story or other information based on popularity, relevance, previous user history, user preferences or the like. In some examples, the device 102 may rotate multiple times an hour (e.g., six times an hour) to display trending news stories to the user. The sixth page of content illustrated in FIG. 2 includes a headline (e.g., "$20 bill will feature Harriet Tubman"), a time associated with the headline (e.g., "1 hour ago"), an indication of other trending news stories (e.g., "+2 more trending stories") and an instruction to see more trending news stories (e.g., "Try '<Wakeword>, what's my flash briefing?'").

For each page of content illustrated in FIG. 2, the device 102 may include instructions for the user to interact with the device 102 regarding a particular page of content. For example, the second page of content corresponding to Feature Group 2 (e.g., Communications 221) may display the instruction "Try '<Wakeword>, what are my messages?'" and if the device 102 detects a corresponding voice command, the device 102 will stop displaying the pages of content and will open a new page corresponding to messaging functionality on the device 102. Thus, the user will be able to view all of the messages received by the device 102 and may control the device 102 using voice commands, touch inputs and/or other inputs. Similarly, the third page of content corresponding to Feature Group 3 (e.g., Calendar 222) may display the instruction "Try '<Wakeword>, what's on my calendar?'" and if the device 102 detects a corresponding voice command, the device 102 will stop displaying the pages of content and will open a new page corresponding to the calendar functionality on the device 102. Thus, the user will be able to view all of the calendar events stored on the device 102 and may control the device 102 as discussed above. When the user is finished with the messaging functionality and/or the calendar functionality, the user may instruct the device 102 to return to Feature Group 1 and continue to display the pages of content. Additionally or alternatively, the user may instruct the device 102 to return to the previous page displayed prior to receiving the voice command, such as the second page of content or the third page of content.

In some examples, the device 102 may display different content based on a distance to the user. For example, the device 102 may detect that user(s) are in close proximity to the device 102 using the camera 106, based on receiving touch input or the like. For example, the device 102 may detect a distance to the user based on touch input on the display 104, image data captured by the camera 106, audio data captured by the microphone(s) 108, sensor data (e.g., motion sensor, vibration sensor or the like), location data associated with a mobile device of the user, or the like. Thus, the device 102 may determine when the user is within a threshold distance (e.g., within 7 feet of the device 102) or further than the threshold distance (e.g., more than 7 feet away from the device 102). When the user is close to the device 102 (e.g., within the threshold distance), the device 102 may display more content for each of the pages of content (e.g., multiple messages instead of a single message), whereas when the user is far from the device 102 (e.g., further than the threshold distance), the device 102 may display less content for each of the pages of content (e.g., a single message). As a result, the content displayed by the device 102 may vary based on the distance to the user to improve a visibility of the content.

While FIG. 2 illustrates examples of only a few pages of content, the disclosure is not limited thereto and the device 102 may display additional pages of content without departing from the disclosure.

In some examples, the device 102 may display multiple pages of content directed to a single feature group illustrated in FIG. 2. As a first example, the device 102 may separate a single feature group into multiple pages of content to display. For example, the device 102 may display a first page of content corresponding to Feature Group 3 (e.g., Calendar 222), such as a daily calendar, and a second page of content corresponding to Feature Group 3, such as a weekly or monthly calendar. Similarly, the device 102 may display a first page of content corresponding to Feature Group 5 (e.g., Contacts 224), such as personal contacts, and a second page of content corresponding to Feature Group 5, such as business contacts. As a second example, the device 102 may generate multiple pages of content based on a number of users in proximity to the device 102. For example, the device 102 may detect that a first user and a second user are in proximity to the device 102 and may display a first page of content corresponding to Feature Group 3 for the first user and a second page of content corresponding to Feature Group 3 for the second user.

Additionally or alternatively, the device 102 may display additional pages of content that are not illustrated in FIG. 2. For example, the device 102 may display additional pages of content directed to a smart home (e.g., page(s) of content indicating lights, doors, locks or other connected devices that can be controlled by the device 102), a smart phone (e.g., page(s) of content indicating applications or other information specific to a smart phone of the user), an electric car (e.g., page(s) of content indicating battery charge level or other information associated with an electric car when the electric car is parked in proximity to the device 102), multimedia content (e.g., page(s) of content corresponding to digital content being displayed on a television or other device in proximity to the device 102, such as indicating actors represented in the digital content, trivia or other information associated with the digital content), music (e.g., page(s) of content corresponding to music that is controllable by the device 102), targeted messages (e.g., page(s) of content corresponding to advertising, recommended purchases, recommended applications, recommended content, sponsored content, etc. based on an identity of the user(s), user preferences, device settings, account settings or the like), lists (e.g., to-do lists, shopping lists, household management, etc.), weather (e.g., weather forecasts, UV index, etc.), utilities (e.g., current load on power grid, etc.) or any other type of content requested by the user. Thus, the device 102 may display additional pages of content based on user preferences, enabling the user to select pages of content to display and generate additional pages of content based on skills or other applications available to the device 102.

In some examples, pages of content may overlap and include identical information or be directed to similar features. For example, a first feature group may be directed generally to music (e.g., music stored on the device 102, accessible via the server(s) 112, streaming content, etc.) while a second feature group may be directed to a specific music application or streaming service.

In some examples, the device 102 may change the pages of content to be displayed based on the user(s) and/or number of user(s) in proximity to the device 102. For example, the device 102 may display first pages of content when a first user is alone in proximity to the device 102, but may display second pages of content when multiple users are in proximity to the device 102. Thus, the device 102 may display additional information when there is a single user but may display less information when there are multiple users in order to protect a privacy of the first user. For example, the device 102 may only display information associated with each of the multiple users (e.g., a shared message, shared upcoming event or the like). Additionally or alternatively, the device 102 may separately display information pertaining to each of the multiple users, enabling a first user to see a first message page and a second user to see a second message page. Thus, instead of protecting the privacy of the first user, the device 102 enables the first user to see personalized content while enabling the second user to also see personalized content.

In some examples, the device 102 may generate personalized content for multiple users, such as recommending content based on common interests between two users or the like. Additionally or alternatively, the device 102 may generate shared content (e.g., shared calendar) corresponding to the two users. Based on user preferences and privacy settings, the device 102 may determine to display a single page of content (e.g., shared calendar) or multiple pages of content, such as a first page directed to a first user (e.g., first user's calendar), a second page directed to a second user (e.g., second user's calendar) and a third page directed to content shared between the first user and the second user (e.g., shared calendar).

In some examples, some content may not be directed to an individual user but may be directed to a group of users, such as a family, a household, an account or the like. For example, some content may be intended for everyone in the family to see (e.g., mother, father, children), adults in the family to see (e.g., mother, father) or other variations. Thus, the device 102 may determine relevant content based on the identity of the user in proximity to the device 102, including personal content and general content. Examples of general content include group messages, a to-do list, a shopping list, household management, timers or alarms, although the disclosure is not limited thereto.

Figure 3:
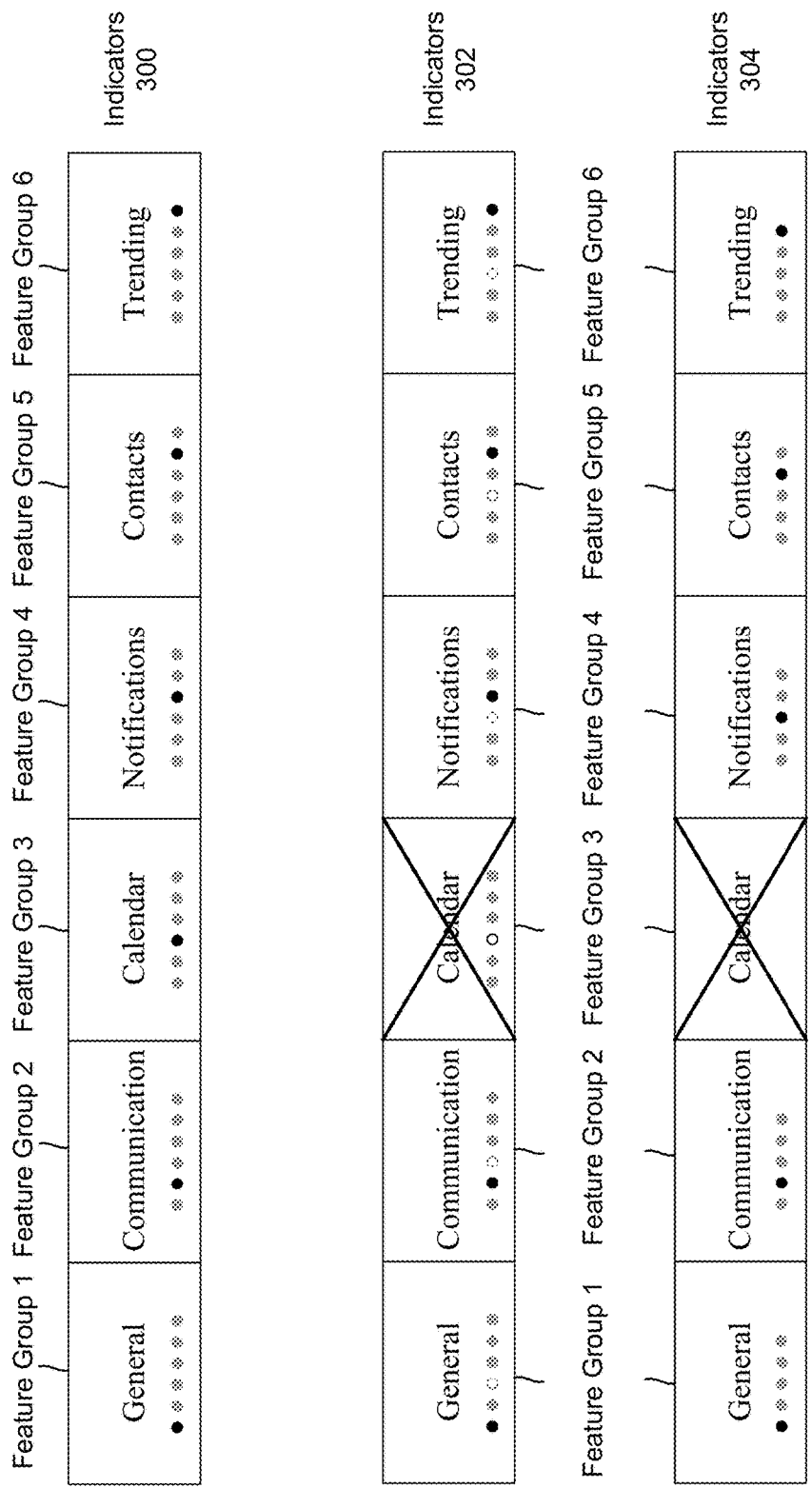
FIG. 3 illustrates examples of sequence indicators according to embodiments of the present disclosure.

FIG. 3 illustrates examples of sequence indicators according to embodiments of the present disclosure. As illustrated in FIGS. 2 and 3, the device 102 may indicate the number of pages of content and a sequence within the pages of content using a visual indicator. For example, FIG. 2 includes six pages of content and each of the pages of content includes six small circles to indicate their sequence within the six pages of content. Thus, the first page (e.g., General Information 220) emphasizes a first circle of the six circles, the second page (e.g., Communications 221) emphasizes a second circle of the six circles, the third page (e.g., Calendar 222) emphasizes a third circle of the six circles, the fourth page (e.g., Notifications 223) emphasizes a fourth circle of the six circles, the fifth page (e.g., Contacts 224) emphasizes a fifth circle of the six circles, and the sixth page (e.g., Trending News 225) emphasizes a sixth circle of the six circles.

While the device 102 may generate a plurality of pages of content, some of the pages of content may not be relevant and therefore the device 102 may not display some of the pages of content. For example, the device 102 may selectively display pages of content based on relevant data to display to the user. FIG. 3 illustrates a first example of indicators 300 that include six total pages of content and emphasize a location within the sequence for each of the pages of content. However, FIG. 3 illustrates a second example that occurs when the device 102 determines that the calendar page 314 does not include relevant calendar entries, such as when there are no upcoming events to display.

As illustrated in FIG. 3, the device 102 may generate indicators 302 that include the calendar page 314 (e.g., there are six circles in the indicator) but depict the calendar page 314 differently to indicate that there is no relevant content to display (e.g., the indicators 302 include a hollow circle for the calendar page 314 to indicate that there is no content to display, whereas the indicators 302 include a gray circle for the remaining pages of content). Thus, the number of pages of content indicated by the indicators 302 does not change based on relevant content, but the pages of content without relevant content are visually depicted to indicate to the user that they lack relevant content. Additionally or alternatively, the device 102 may generate indicators 304 that do not include the calendar page 3 14 (e.g., there are only five circles in the indicator). Thus, the number of pages of content indicated by the indicators 304 changes based on the relevant content.

To determine the pages of content that have relevant content, the device 102 may identify data associated with each of the pages of content (e.g., feature groups) and may determine relevant data for each of the pages of content using individual parameters. For example, relevant data associated with the communication page 312 may include messages received within a previous duration of time, such as messages received in the past 24 hours. In contrast, relevant data associated with the calendar page 314 may include calendar events that are within a future duration of time, such as calendar events that occur in the next 24 hours. Thus, while the duration of time is identical for the communication page 312 and the calendar page 314, the device 102 does not identify calendar events that already occurred as relevant data. Other examples of parameters include notifications received within a previous duration of time (e.g., items were shipped), notifications of events that will occur within a future duration of time (e.g., shipments will be received), contacts that are currently available, contacts that were recently available, trending stories received within a previous duration of time, or the like.

In some examples, relevant data that has been displayed to the user may be marked as no longer relevant for when the device 102 displays pages of content again. For example, the device 102 may determine an unread message to be relevant data at a first time, but after displaying the unread message to the user, the device 102 may not determine the now-read message to be relevant data at a second time. However, the disclosure is not limited thereto and the now-read message may remain relevant data for a duration of time (e.g., messages are relevant for up to 24 hours) or until a subsequent message is received (e.g., new unread message is considered relevant data).

The device 102 generates and displays the indicators in order to indicate a location within a sequence of pages of content. Thus, as the device 102 displays the pages of content in order, the indicators provide context to the user. The device 102 may transition between the pages of content using different transition timing based on user preferences or the like.

Figure 4B:
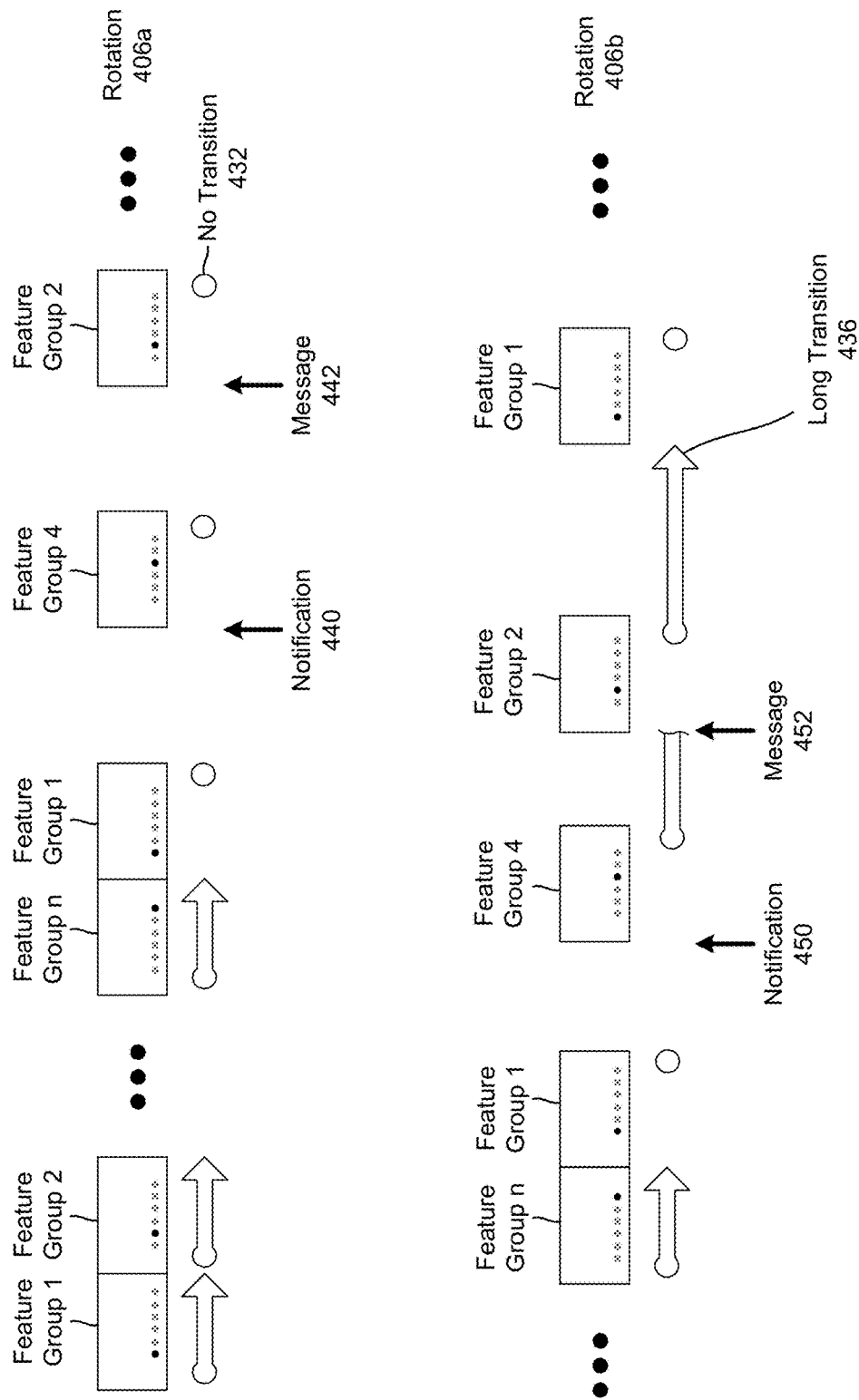
Figure 4C:
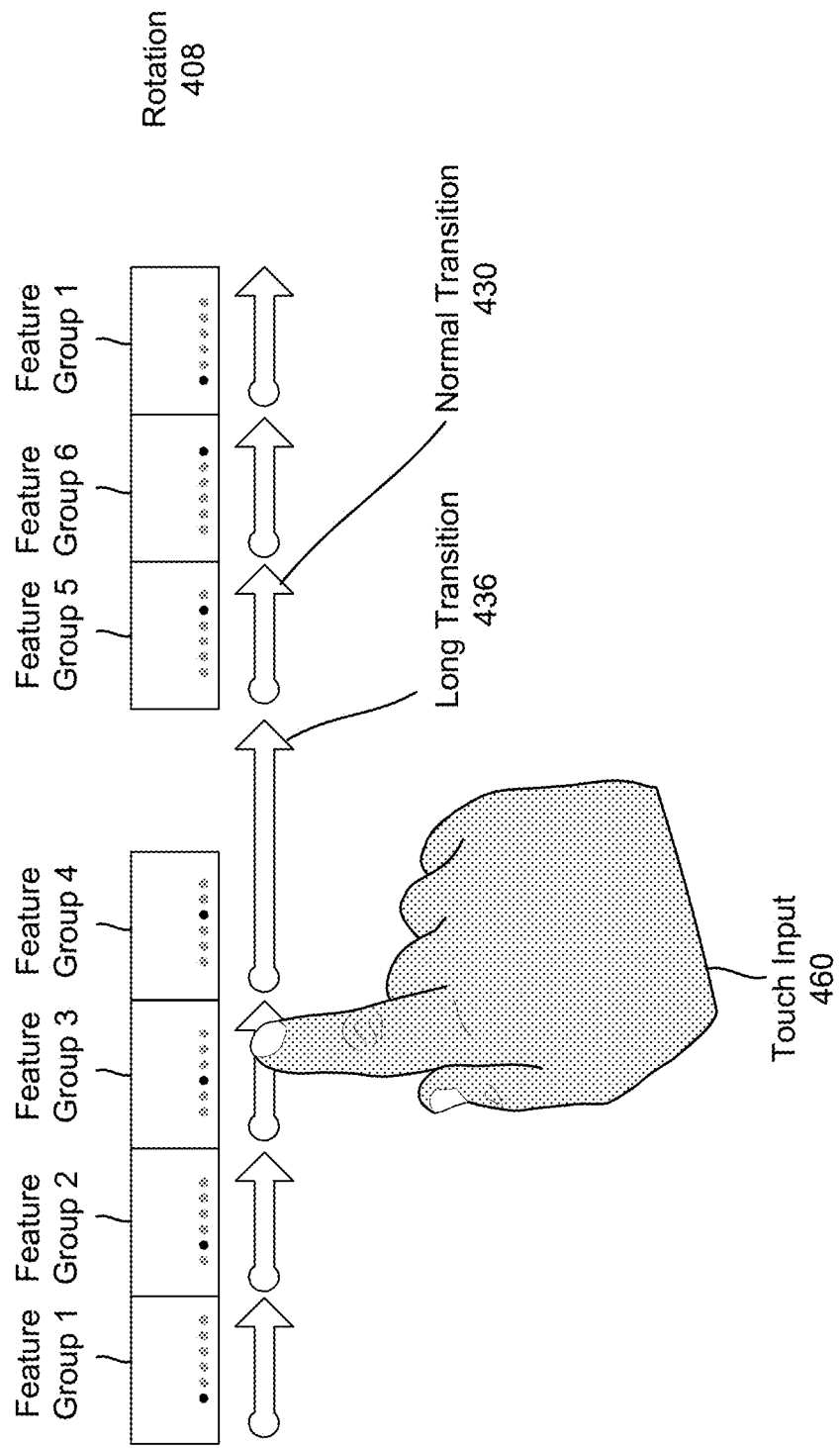

FIGS. 4A-4C illustrate examples of transition timing according to embodiments of the present disclosure. In some examples, the device 102 may display the pages of content in order before displaying the first page. For example, FIG. 4A illustrates a rotation 400 by which the device 102 cycles through the pages of content (e.g., Feature Group 1, Feature Group 2, Feature Group 3, . . . Feature Group n) before displaying the first page without additional transitions. The first time the device 102 displays the first page of content, the device 102 uses a normal transition 430 to advance to the second page of content and continues to use the normal transition 430 to advance through the pages of content. After cycling through the pages of content and displaying the first page of content a second time, however, the device 102 continues to display the first page with no transition 432. Thus, the device 102 displays the first page until the device 102 receives an input from the user or enters a sleep mode.

In some examples, the device 102 may display the pages of content by cycling through the pages of content continuously. For example, the device 102 may continuously display pages of content using a fixed transition timing (e.g., the normal transition 430). To illustrate, FIG. 4A includes a rotation 402 by which the device 102 cycles through the pages of content a first time (e.g., Feature Group 1, Feature Group 2, Feature Group 3, . . . Feature Group n) before cycling through the pages a second time, a third time and so on. Thus, the device 102 continuously displays the pages of content in order using the normal transition 430 between the pages of content.

In other examples, the device 102 may display the pages of content by cycling through the pages of content continuously but varying transition timing. For example, the device 102 may display the pages of content a first time using a first transition timing (e.g., normal transition 430) and then display the pages of content using a second transition timing (e.g., short transition 434). To illustrate, FIG. 4A includes a rotation 404 by which the device 102 cycles through the pages of content using the normal transition 430 a first time (e.g., Feature Group 1, Feature Group 2, Feature Group 3, . . . Feature Group n) before cycling through the pages of content using the short transition 434 a second time, a third time and so on. Thus, the device 102 continuously displays the pages of content in order, using the normal transition 430 between the pages of content in the first cycle and using the short transition 434 in subsequent cycles. While FIG. 4A illustrates the first cycle corresponding to a longer transition time than future cycles (e.g., normal transition 430 is longer than short transition 434), the disclosure is not limited thereto and the device 102 may lengthen the transition time for future cycles without departing from the disclosure. For example, the device 102 may display the first cycle using the short transition 434 and may display future cycles using the normal transition 430. Additionally or alternatively, the device 102 may vary the transition time based on other variables, such as a number of cycles (e.g., the transition time continues to increase/decrease each cycle), a length of time since receiving an input, or the like.

In some examples, the device 102 may display the pages of content in order before displaying the first page a second time, as discussed above with regard to rotation 400, but then may display individual pages of content as relevant data is received. For example, the device 102 may cycle through the pages of content (e.g., Feature Group 1, Feature Group 2, Feature Group 3, . . . Feature Group n) and display the first page a second time without advancing (e.g., no transition 432). While displaying the first page the second time, the device 102 may receive a notification 440 and display the fourth page of content corresponding to Feature Group 4 (e.g., notifications 223) without advancing (e.g., no transition 432). Similarly, while displaying the fourth page corresponding to Feature Group 4, the device 102 may receive a message 442 and display the second page of content corresponding to Feature Group 2 (e.g., communications 221) without advancing (e.g., no transition 432). Thus, rotation 406a continues to display the most recently displayed page of content until the device 102 receives an input from the user or enters a sleep mode.

In some examples, the device 102 may display the most recently displayed page of content for a duration of time before displaying the first page of content again. For example, while displaying the first page the second time without advancing (e.g., no transition 432), the device 102 may receive a notification 450 and display the fourth page of content corresponding to Feature Group 4 (e.g., notifications 223) up to a duration of time (e.g., long transition 436). However, while displaying the fourth page before the duration of time has elapsed, the device 102 may receive a message 452 and display the second page of content corresponding to Feature Group 2 (e.g., communications 221). After displaying the second page without receiving additional relevant data and/or input from a user for the duration of time (e.g., long transition 436), the device 102 may display the first page again. Thus, rotation 406b continues to display the most recently displayed page of content until the duration of time elapses or the device 102 receives an input from the user or enters a sleep mode.

While displaying a first page of content, the device 102 may display a second page of content based on input from a user. For example, the device 102 may receive a touch input, a voice command or other inputs known to those of skill in the art and may display the pages of content based on the input. As illustrated in FIG. 4C, the device 102 may display pages of content using the normal transition 430 between pages of content. For example, the device 102 may display Feature Group 1, Feature Group 2 and Feature Group 3 using the normal transition 430. While displaying the third page of content corresponding to Feature Group 3, however, the device 102 may receive touch input 460 instructing the device 102 to advance to the next page of content. As a result, the device 102 may display Feature Group 4 until the device 102 doesn't detect input for a period of time (e.g., long transition 436), at which point the device 102 may display continue advancing through the pages of content (e.g., Feature Group 5, Feature Group 6, Feature Group 1 and so on) using the normal transition 430 between pages. Thus, as illustrated by rotation 408, the device 102 may alter the transition timing in response to the input from the user.

While FIG. 4C illustrates the transition time being longer after receiving the input from the user, the disclosure is not limited thereto and the device 102 may maintain or shorten a transition time after receiving the input. Additionally or alternatively, while FIG. 4C illustrates the device 102 receiving touch input 460 that instructs the device 102 to advance the pages of content (e.g., display Feature Group 4 instead of Feature Group 3), the disclosure is not limited thereto and the device 102 may receive voice input, touch input or other input and/or the input may instruct the device 102 to advance to a subsequent page, return to a previous page, go to a specific page of content or the like without departing from the disclosure.

Figure 5A:
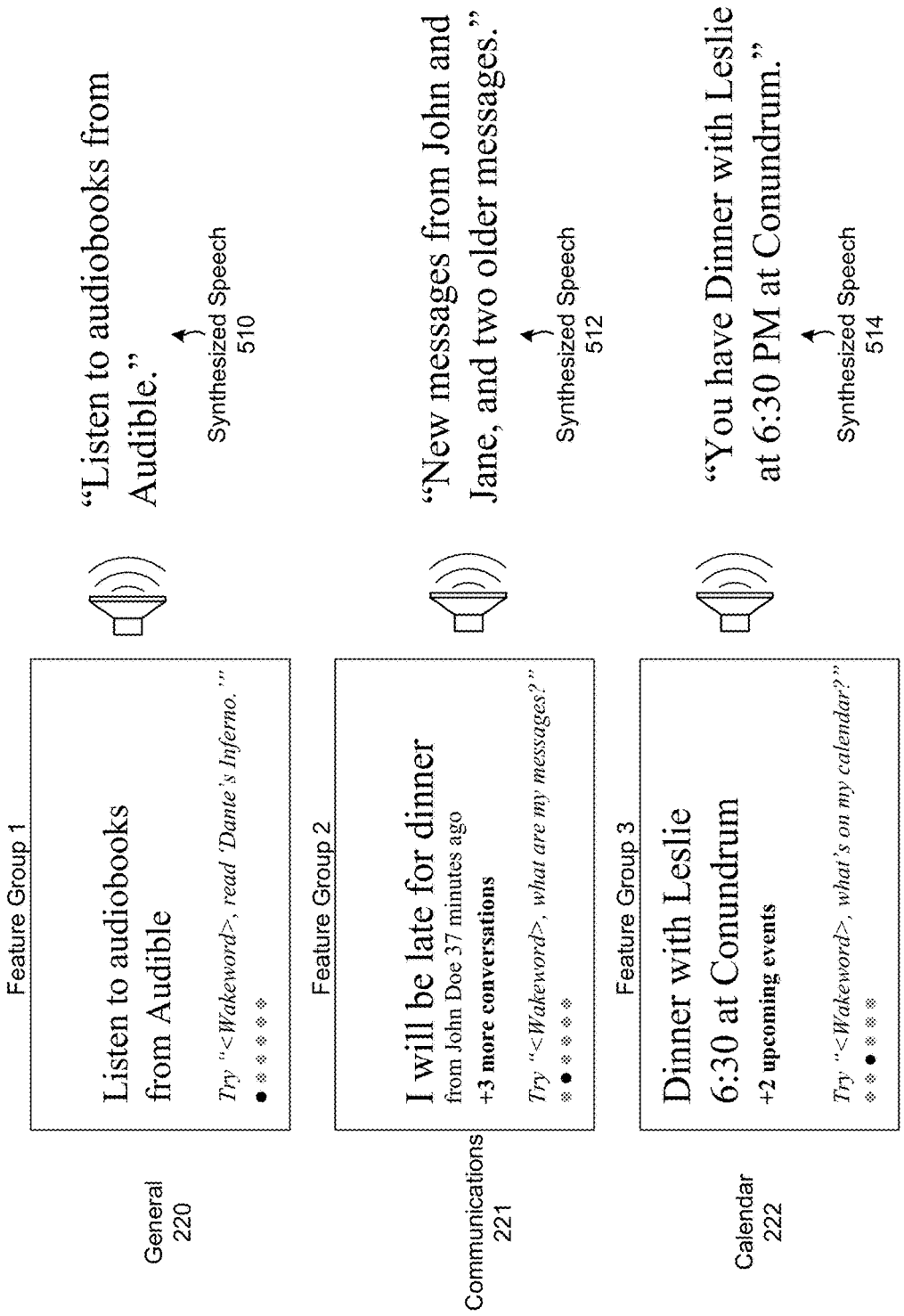
FIGS. 5A-5B illustrate examples of audio output according to embodiments of the present disclosure.
Figure 5B:

FIGS. 5A-5B illustrates examples of audio output according to embodiments of the present disclosure. As discussed above, the device 102 may generate audio output while displaying the pages of content, such that the audio output is synchronized to the display of the pages of content. For example, while displaying a first page of content corresponding to Feature Group 1 (e.g., General Information 220), the device 102 may generate audio output including synthesized speech 510 corresponding to "listen to audiobooks from Audible." While displaying a second page of content corresponding to Feature Group 2 (e.g., Communications 221), the device 102 may generate audio output including synthesized speech 512 corresponding to "New messages from John and Jane, and two older messages." While displaying a third page of content corresponding to Feature Group 3 (e.g., Calendar 222), the device 102 may generate audio output including synthesized speech 514 corresponding to "You have Dinner with Leslie at 6:30 PM at Conundrum." While displaying a fourth page of content corresponding to Feature Group 4 (e.g., Notifications 223), the device 102 may generate audio output including synthesized speech 516 corresponding to "Your item arrives today by 8 PM and four older updates." While displaying a fifth page of content corresponding to Feature Group 5 (e.g., Contacts 224), the device 102 may generate audio output including synthesized speech 518 corresponding to "John Doe and three other friends are available." While displaying a sixth page of content corresponding to Feature Group 6 (e.g., Trending News 225), the device 102 may generate audio output including synthesized speech 520 corresponding to "$20 bill will feature Harriet Tubman."

While FIGS. 5A-5B illustrate examples of synthesized speech corresponding to the pages of content, the disclosure is not limited thereto and the synthesized speech may vary. For example, the synthesized speech may include an instruction that can be input to the device 102 to learn more about each of the pages of content, such as "Try '<Wakeword>, what are my messages?'" for the second page (e.g., Communications 221), "Try '<Wakeword>, what's on my calendar?'" for the third page (e.g., Calendar 222), etc.

While FIGS. 5A-5B illustrate specific examples of synthesized speech output by the device 102, the disclosure is not limited thereto. Instead, the device 102 may output any synthesized speech that is relevant to the content displayed by the device 102 based on user preferences or the like. For example, the device 102 may output synthesized speech that summarizes the content displayed (e.g., "You have one new message"), that adds details associated with the content displayed (e.g., "New messages from John and Jane, and two older messages"), that verbalizes the content displayed verbatim (e.g., "You received a message 'I will be late for dinner' from John Doe 37 minutes ago and three more conversations") or the like. Thus, the device 102 may output synthesized speech having varying levels of detail associated with the content being displayed. Further, the device 102 and/or the server(s) 112 may generate the synthesized speech, as will be discussed below with regard to FIG. 10. Thus, the device 102 may generate the synthesized speech locally or may receive the synthesized speech from the server(s) 112.

In some examples, the device 102 may synchronize a transition timing used to display the pages of content with the synthesized speech. Thus, while FIG. 4A illustrates the device 102 cycling through the pages of content using a fixed transition time (e.g., normal transition 430), the transition time may vary based on a length of synthesized speech. For example, the device 102 may advance from the second page of content (e.g., Communications 221) to the third page of content based on the normal transition 430 or a length of time required to output the synthesized speech 512, whichever is longer. Thus, if the normal transition 430 corresponds to one second and the synthesized speech 512 corresponds to three seconds, the device 102 may display the second page of content for three seconds before advancing to the third page of content. As a result, the device 102 displays content for at least a minimum amount of time (e.g., normal transition 430) but may display the content for longer than the minimum amount of time as necessary in order to synchronize the audio output and the content being displayed.

In some examples, the device 102 may generate audio output whenever the device 102 displays the pages of content. However, the disclosure is not limited thereto and the device 102 may generate the audio output (e.g., synthesized speech) only when prompted by input from the user. For example, the device 102 may display the pages of content without corresponding audio output unless the user specifically requests that the device 102 generate the audio output. Additionally or alternatively, the device 102 may generate the audio output selectively based on user preferences. For example, the device 102 may generate the audio output in response to voice input requesting the device 102 to display the pages of content, but not in response to touch input requesting the device 102 to display the pages of content. Thus, the device 102 may display content silently in certain situations and generate the audio output in other situations based on user preferences, account preferences, device settings, input to the device 102 or the like.

The device 102 may receive a voice command from the user while displaying a page of content. In some examples, the device 102 may determine contextual information to assist with performing speech processing, as will be discussed in greater detail below with regard to FIG. 9, based on the page of content being displayed. For example, the device 102 may associate a first domain with a first feature group. When the device 102 receives a voice command while displaying a page of content corresponding to the first feature group, the device 102 may generate contextual information that indicates the first domain and/or other information and may associate the contextual information with the voice command.

Figure 6A:
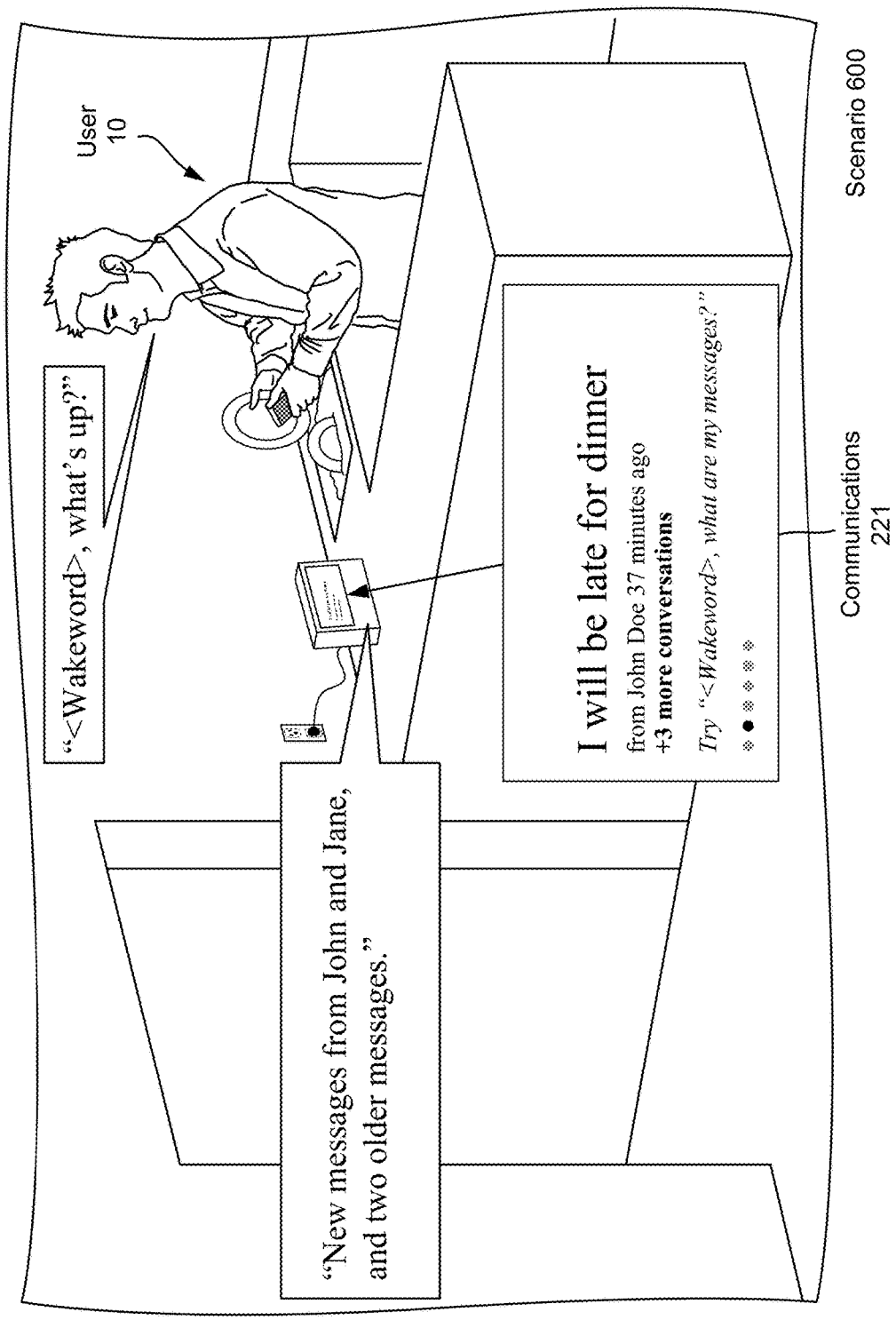
FIGS. 6A-6B illustrate examples of customer interaction according to embodiments of the present disclosure.
Figure 6B:
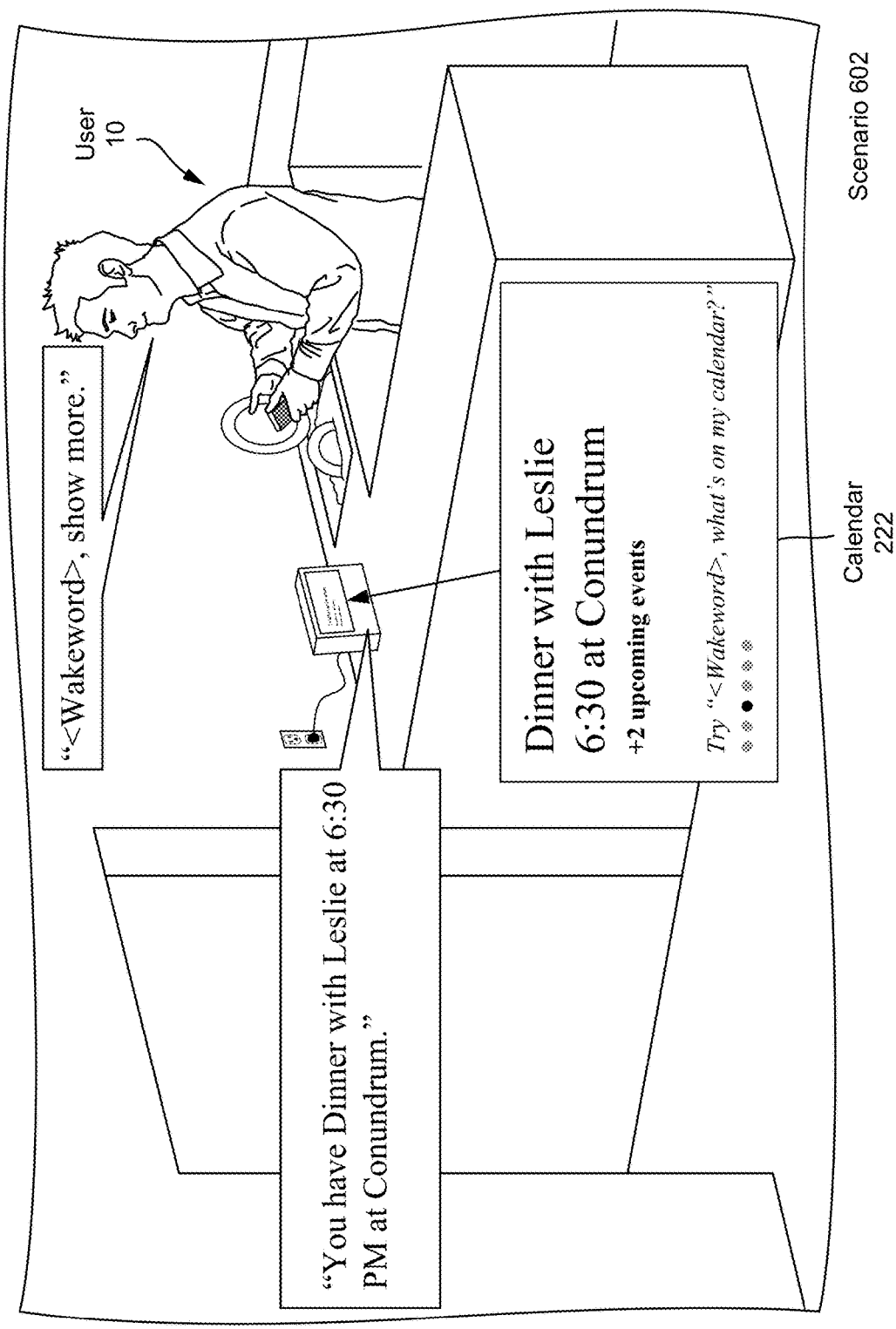

FIGS. 6A-6B illustrate examples of customer interaction according to embodiments of the present disclosure. As illustrated in FIG. 6A, the device 102 may detect a first voice command of "<Wakeword>, what's up?" from a user 10. In response to the first voice command, the device 102 may display the pages of content while generating audio output. For example, in scenario 600 the device 102 may display the second page of content corresponding to Feature Group 2 (e.g., Communications 221) while generating audio output including synthesized speech corresponding to "New messages from John and Jane, and two older messages."

As illustrated in FIG. 6B, the device 102 may detect a second voice command of "<Wakeword>, show more" from the user 10. In response to the second voice command, the device 102 may display a subsequent page of content (e.g., third page of content corresponding to Feature Group 3 (e.g., Calendar 222)) while generating audio output including synthesized speech corresponding to "You have Dinner with Leslie at 6:30 PM at Conundrum," as illustrated in scenario 602. As discussed above with regard to FIG. 4C, the device 102 may display the third page of content for a longer period of time (e.g., long transition 436) relative to the time spent displaying other pages of content (e.g., normal transition 430) due to receiving the voice command.

The wakeword may be an indication to the device 102 that a user intends to speak a voice command to the device 102, as described in greater detail below with regard to FIG. 9. For example, the device 102 may convert audio into audio data using the microphone(s) 108 and process the audio data to determine whether speech is detected in the audio. If speech is detected in the audio, the device 102 may determine if the audio data comprising speech matches an audio signature and/or model corresponding to a particular keyword. Once speech is detected in the audio data, the device 102 may perform wakeword detection to determine when a user intends to speak a command to the device 102. This process may also be referred to as keyword detection, with the wakeword being a specific example of a keyword. Thus, the wakeword may vary based on user preferences, account settings, device settings or the like, and is illustrated in the drawings as <Wakeword>.

The device 102 may operate in a sleep mode (e.g., display dimmed or powered off) until detecting a wakeword or detecting human presence. Upon detecting the wakeword or the human presence, the device 102 may enter a display mode and display the pages of content to a user. The device 102 may detect human presence using any techniques known to one of skill in the art, such as using the camera 106, the microphone(s) 108, sensors (e.g., motion detectors, vibration detectors or the like), detecting a mobile device associated with the person, or the like. For example, the device 102 may capture image data using the camera 106 and may identify a person represented in the image data using human-detection algorithm(s), such as by identifying the shape of a human (e.g., face, head, shoulder or other distinctive shapes) in the image data. Additionally or alternatively, the device 102 may capture audio data using the microphone(s) 108 and may identify a person represented in the audio data, such as recognizing a voice, sound of breathing or the like.

In some examples, the device 102 may detect whether a person is in proximity to the device and/or a distance to the person. For example, the device 102 may detect a distance to the user based on touch input on the display 104, image data captured by the camera 106, audio data captured by the microphone(s) 108, sensor data (e.g., motion sensor, vibration sensor or the like), location data associated with a mobile device of the user, or the like. Thus, the device 102 may determine when the user is within a threshold distance (e.g., within 7 feet of the device 102) or further than the threshold distance (e.g., more than 7 feet away from the device 102), although the threshold distance may vary. Using similar techniques, the device 102 may determine if a single user is in proximity to the device 102 or if multiple users are in proximity to the device 102.

In some examples, the device 102 may determine an identity of the user(s) based on facial recognition, voice recognition, location data associated with a mobile device of the user or other techniques known to one of skill in the art. Thus, the device 102 may be aware of a location and an identity of each user in proximity to the device 102 and may personalize content based on the location and the identity, as discussed in greater detail with regard to FIG. 2.

FIG. 7 illustrates examples of display themes according to embodiments of the present disclosure. As illustrated in FIG. 7, the device 102 may display the pages of content using different themes. For example, the device 102 may use a day theme 710, which is illustrated as having a light background and dark text, a night theme 712, which is illustrated as having a dark background with light text, or a photo theme 714, which is illustrated as having a background image with text above the background image. The day theme 710 may be beneficial in a bright environment such as during daylight, as the day theme 710 will increase a brightness of the screen so that the screen is visible in the bright environment. In contrast, the night theme 712 may be beneficial in a dark environment such as at night, as the night theme 712 will decrease a brightness of the screen so that the screen is not too bright in the dark environment.

The photo theme 714 enables the device 102 to display image(s) to the user based on user preferences. For example, the photo theme 714 may display a single image, may display multiple images over time, may display individual images corresponding to each of the pages of content, or the like. In addition, a brightness of the photo theme 714 may vary, resulting in a range of brightness between the night theme 712 and the day theme 710. For example, the device 102 may vary an opacity of a gray filter that is superimposed over the image being displayed, with a strong opacity resulting in a dark gray filter (e.g., the image is darkened so that the text is easily distinguishable from the image) and a light opacity resulting in a light gray filter (e.g., the image is bright and the text is more difficult to distinguish from the image).

While FIG. 7 illustrates the day theme 710, the night theme 712 and the photo theme 714, the disclosure is not limited thereto and other themes may be implemented by the device 102 without departing from the disclosure. For example, the device 102 may include additional themes such as a variation on the photo theme 714 (e.g., an animated background, video data, etc.), targeted content (e.g., advertisement theme or the like) and/or entertainment themes (e.g., a theme mimicking a popular television series, movie or the like). Additionally or alternatively, the device 102 may alternate between the themes based on user preferences, such as using the day theme 710 during daylight hours (e.g., when an ambient brightness of the room is above a threshold) and the photo theme 714 during nighttime hours (e.g., when the ambient brightness of the room is below the threshold).

In addition to varying the themes, the device 102 may display additional features on the pages of content. In some examples, the device 102 may display the additional features only on the first page of content corresponding to Feature Group 1 (e.g., General Information 220), although the disclosure is not limited thereto. Instead, the device 102 may display the additional features on any of the pages of content without departing from the present disclosure.

Figure 8B:
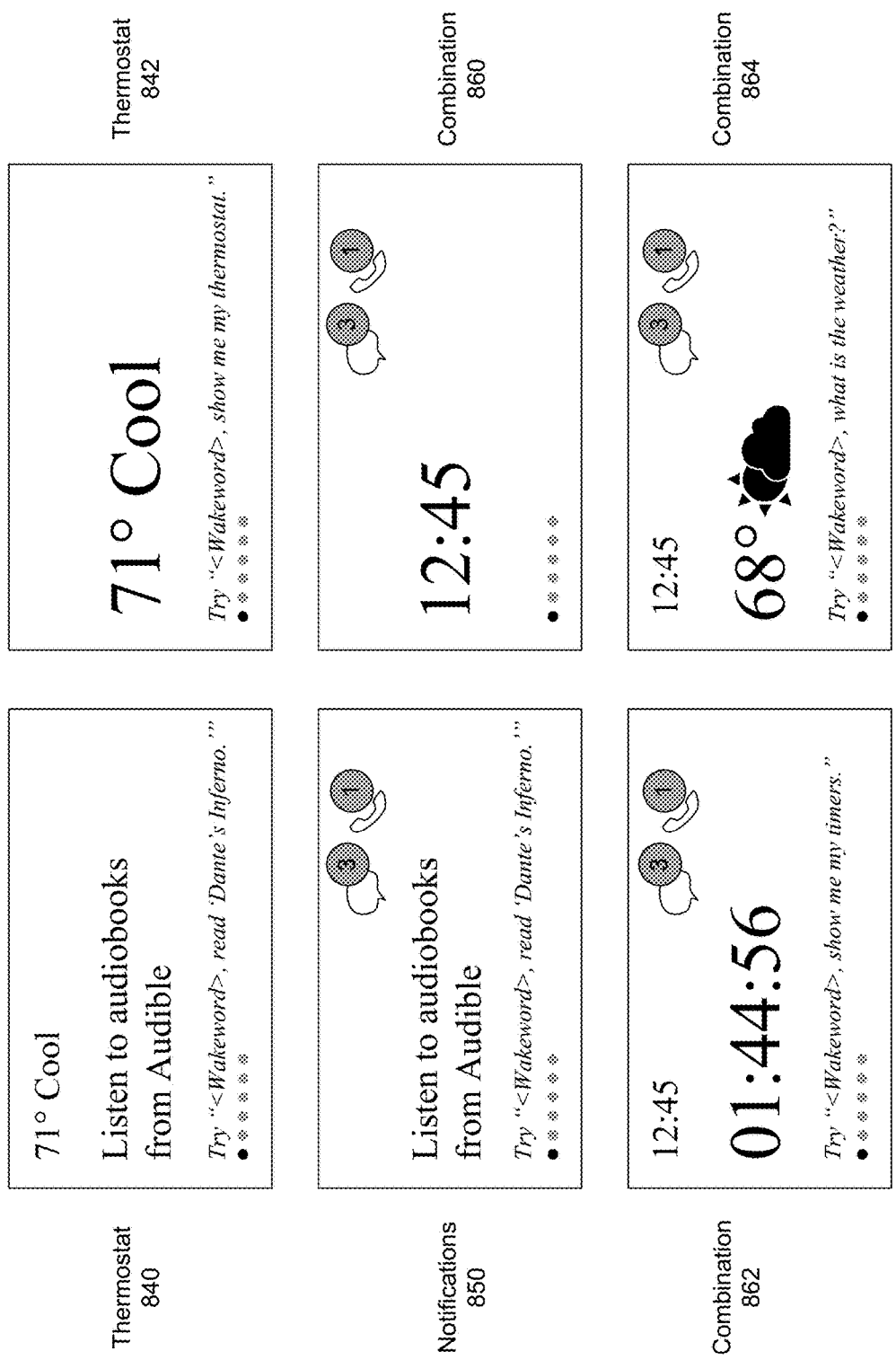

FIGS. 8A-8B illustrate examples of display features according to embodiments of the present disclosure. As illustrated in FIG. 8A, the device 102 may display a clock 810 in addition to other content in the pages of content, such as in a top left corner of the display 104. Additionally or alternatively, the device 102 may display a clock 812 in place of other content, such as in the middle of the display 104 when the device 102 is displaying the first page of content corresponding to Feature Group 1 (e.g., General Information 220). The clock 810/812 may indicate a local time zone, a remote time zone, multiple time zones or the like.

As illustrated in FIG. 8A, the device 102 may display a timer 820 in addition to other content in the pages of content, such as in the top left corner of the display 104. Additionally or alternatively, the device 102 may display a timer 822 in place of other content, such as in the middle of the display 104 when the device 102 is displaying the first page of content corresponding to Feature Group 1 (e.g., General Information 220). The timer 820/822 may correspond to a single timer, multiple timers or the like.

As illustrated in FIG. 8A, the device 102 may display weather information 830 in addition to other content in the pages of content, such as in the top left corner of the display 104. Additionally or alternatively, the device 102 may display weather information 832 in place of other content, such as in the middle of the display 104 when the device 102 is displaying the first page of content corresponding to Feature Group 1 (e.g., General Information 220). The weather information 830/832 may be associated with local weather (e.g., a location of the device 102), distant weather (e.g., a particular zip code or city), multiple locations, a current forecast, a future forecast, a combination thereof or the like. The weather information 830/832 may include a temperature, current weather, weather forecast(s) and/or additional information such as weather alerts, wind speed or the like.

As illustrated in FIG. 8B, the device 102 may display a thermostat 840 in addition to other content in the pages of content, such as in the top left corner of the display 104. Additionally or alternatively, the device 102 may display a thermostat 842 in place of other content, such as in the middle of the display 104 when the device 102 is displaying the first page of content corresponding to Feature Group 1 (e.g., General Information 220). The thermostat 840/842 may correspond to a heating, ventilation, and air conditioning (HVAC) system that controls a room temperature in proximity to the device 102. For example, the thermostat 840/842 may indicate a current temperature, a low temperature (e.g., temperature at which the heat will turn on), a high temperature (e.g., temperature at which air conditioning will turn on) or a combination thereof. In some examples, the device 102 may control a thermostat of the HVAC system based on input from the user.

As illustrated n FIG. 8B, the device 102 may display notifications 850 in addition to other content in the pages of content, such as in a top right corner of the display 104. The notifications 850 may include unread messages, recent messages, missed calls, recent calls or a combination thereof. For example, the notifications 850 illustrated in FIG. 8B indicates a first number of unread messages and a second number of missed calls. The notifications 850 may be identical to content displayed on the second page of content corresponding to Feature Group 2 (e.g., Communications 221), but the disclosure is not limited thereto and the notifications 850 may be determined using a different duration of time. For example, the device 102 may display a message in the second page of content for up to 24 hours after receiving the message, regardless of whether the message is read by the user, whereas the device 102 may only display the message in the notifications 850 until the message is read by the user.

The device 102 may display a combination of the features illustrated in FIGS. 8A-8B. For example, combination 860 includes the notifications 850 and the clock 812, combination 862 includes the notifications 850, the timer 822 and the clock 810, and combination 864 includes the notifications 850, the weather information 832 and the clock 810. Thus, the first page of content corresponding to Feature Group 1 (e.g., General Information 220) may include multiple indications corresponding to different features. However, the disclosure is not limited thereto and multiple pages of content may include one or more of the features illustrated in FIGS. 8A-8B or other features known to one of skill in the art.

While FIGS. 8A-8B illustrate examples of features, the disclosure is not limited thereto and the device 102 may include other features known to one of skill in the art without departing from the present disclosure. For example, the device 102 may include features indicating an ultraviolet (UV) index, a load on the power grid, information about residential power (e.g., current power consumption, current power generated by solar panels or windmill(s), battery charge level, etc.) or any other features requested by the user.

Additionally or alternatively, the features and the number of features displayed in addition to other content in the pages of content and/or the features and the number of features displayed in place of other content in a page of content may vary over time based on user preferences, device settings or the like. For example, the device 102 may display the clock 810 in the top left corner of the display 104 until the user sets a timer, at which point the device 102 may display the timer 820 in the top left corner of the display 104.

The system 100 of FIG. 1 may operate using various speech processing components as described in FIG. 9. FIG. 9 is a conceptual diagram of how a spoken utterance is processed. The various components illustrated may be located on a same or different physical devices. Communication between various components illustrated in FIG. 9 may occur directly or across network(s) 10. An audio capture component, such as microphone(s) 108 of device 102, captures audio 11 corresponding to a spoken utterance.

The device 102, using a wakeword detection module 920, then processes the audio 11, or audio data 911 corresponding to the audio 11, to determine if a keyword (such as a wakeword) is detected in the audio 11. Following detection of a wakeword, the device sends audio data 911 corresponding to the utterance, to a server(s) 112 that includes an ASR module 950. The audio data 911 may be output from an acoustic front end (AFE) 956 located on the device 102 prior to transmission. Or the audio data 911 may be in a different form for processing by a remote AFE 956.

The wakeword detection module 920 works in conjunction with other components of the device, for example microphone(s) 108 to detect keywords in audio 11. For example, the device 102 may convert audio 11 into audio data 911, and process the audio data 911 with the wakeword detection module 920 to determine whether speech is detected, and if so, if the audio data 911 comprising speech matches an audio signature and/or model corresponding to a particular keyword.

Once speech is detected in the audio 11 received by the device 102 (or separately from speech detection), the device 102 may use the wakeword detection module 920 to perform wakeword detection to determine when a user intends to speak a command to the device 102. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 920 may compare audio data 911 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 911 corresponding to input audio 11 to the server(s) 112 for speech processing. Audio data 911 corresponding to that audio 11 may be sent to a server(s) 112 for routing to a recipient device or may be sent to the server for speech processing for interpretation of the included speech (either for purposes of enabling voice-communications and/or for purposes of executing a command in the speech). The audio data 911 may include data corresponding to the wakeword, or the portion of the audio data 911 corresponding to the wakeword may be removed by the local device 102 prior to sending. Further, a local device 102 may "wake" upon detection of speech/spoken audio above a threshold, as described herein. Upon receipt by the server(s) 112, an ASR module 950 may convert the audio data 911 into text. The ASR transcribes audio data 911 into text data representing the words of the speech contained in the audio data 911. The text data may then be used by other components for various purposes, such as executing system commands, inputting data, etc. A spoken utterance in the audio data 911 is input to a processor configured to perform ASR which then interprets the utterance based on the similarity between the utterance and pre-established language models 954 stored in an ASR model knowledge base (ASR Models Storage 952). For example, the ASR process may compare the input audio data 911 with models for sounds (e.g., subword units or phonemes) and sequences of sounds to identify words that match the sequence of sounds spoken in the utterance of the audio data 911.

An ASR process 950 converts the audio data 911 into text. The ASR transcribes audio data 911 into text data representing the words of the speech contained in the audio data 911. The text data may then be used by other components for various purposes, such as executing system commands, inputting data, etc. A spoken utterance in the audio data 911 is input to a processor configured to perform ASR which then interprets the utterance based on the similarity between the utterance and pre-established language models 954 stored in an ASR model knowledge base (ASR Models Storage 952). For example, the ASR process may compare the input audio data 911 with models for sounds (e.g., subword units or phonemes) and sequences of sounds to identify words that match the sequence of sounds spoken in the utterance of the audio data 911.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 950 outputs the most likely text recognized in the audio data 911. The ASR process may also output multiple hypotheses in the form of a lattice or an N-best list with each hypothesis corresponding to a confidence score or other score (such as probability scores, etc.).

The device or devices performing the ASR process 950 may include an acoustic front end (AFE) 956 and a speech recognition engine 958. The acoustic front end (AFE) 956 transforms the audio data 911 from the microphone(s) 108 into data for processing by the speech recognition engine 958. The speech recognition engine 958 compares the speech recognition data with acoustic models 953, language models 954, and other data models and information for recognizing the speech conveyed in the audio data 911. The AFE 956 may reduce noise in the audio data 911 and divide the digitized audio data 911 into frames representing time intervals for which the AFE 956 determines a number of values, called features, representing the qualities of the audio data 911, along with a set of those values, called a feature vector or audio feature vector, representing the features/qualities of the audio data 911 within the frame. Many different features may be determined, as known in the art, and each feature represents some quality of the audio 11 that may be useful for ASR processing. A number of approaches may be used by the AFE 956 to process the audio data 911, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage 952. Alternatively, post front-end processed data (such as feature vectors) may be received by the device executing ASR processing from another source besides the internal AFE 956. For example, the device 102 may process audio data 911 into feature vectors (for example using an on-device AFE 956) and transmit that information to a server across network(s) 10 for ASR processing. Feature vectors may arrive at the server encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server(s) 112, for natural language understanding (NLU) processing, such as conversion of the text into commands for execution, either by the device 102, by the server(s) 112, or by another device (such as a server running a search engine, etc.).

The device performing NLU processing 960 (e.g., server(s) 112) may include various components, including potentially dedicated processor(s), memory, storage, etc. A device configured for NLU processing 960 may include a named entity recognition (NER) module 952, intent classification (IC) module 964, NLU storage 972 and a and knowledge base (not shown). The knowledge base is a database or other information storage that may include information about entities that may be used in resolving user queries. The NLU process may also utilize gazetteer information (984a-984n) stored in entity library storage 982. The knowledge base and/or gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process 960 takes textual input (such as processed from ASR 950 based on the utterance 11) and attempts to make a semantic interpretation of the text. That is, the NLU process 960 determines the meaning behind the text based on the individual words and then implements that meaning. NLU processing 960 interprets a text string to derive an intent or a desired action from the user as well as the pertinent pieces of information in the text that allow a device (e.g., device 102) to complete that action. For example, if a spoken utterance is processed using ASR 950 and outputs the text "call mom" the NLU process may determine that the user intended to activate a telephone in his/her device and to initiate a call with a contact matching the entity "mom."

The NLU may process several textual inputs related to the same utterance. For example, if the ASR 950 outputs N text segments (as part of an N-best list), the NLU may process all N outputs to obtain NLU results.

As will be discussed further below, the NLU process 960 may be configured to parse and tag to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 960 may be configured to determine a "domain" of the utterance so as to determine and narrow down which services offered by the endpoint device (e.g., server(s) 112 or device 102) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 962 receives a query in the form of ASR results and attempts to identify relevant grammars and lexical information that may be used to construe meaning. To do so, a name entity recognition module 962 may begin by identifying potential domains that may relate to the received query. The NLU storage 972 includes a database of devices (974a-974n) identifying domains associated with specific devices. For example, the device 102 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's music-domain lexical information might include album titles, artist names, and song names, for example, whereas a user's contact-list lexical information might include the names of contacts. Since every user's music collection and contact list is presumably different, this personalized information improves entity resolution.

In some examples, the device 102 may determine contextual information to assist with performing speech processing, such as a domain, based on the page of content being displayed when a voice command is received. For example, the device 102 may associate a first domain with a first feature group. When the device 102 receives a voice command while displaying a page of content corresponding to the first feature group, the device 102 may generate contextual information that indicates the first domain and/or other information and may associate the contextual information with the voice command.

A query may be processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains being ordinarily selected to be the correct result.

An intent classification (IC) module 964 parses the query to determine an intent or intents for each identified domain, where the intent corresponds to the action to be performed that is responsive to the query. Each domain is associated with a database (978a-978n) of words linked to intents. For example, a music intent database may link words and phrases such as "quiet," "volume off," and "mute" to a "mute" intent. The IC module 964 identifies potential intents for each identified domain by comparing words in the query to the words and phrases in the intents database 978.

In order to generate a particular interpreted response, the NER 962 applies the grammar models and lexical information associated with the respective domain. Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC module 964 are linked to domain-specific grammar frameworks (included in 976) with "slots" or "fields" to be filled. For example, if "play music" is an identified intent, a grammar (976) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 962 may parse the query to identify words as subject, object, verb, preposition, etc., based on grammar rules and models, prior to recognizing named entities. The identified verb may be used by the IC module 964 to identify intent, which is then used by the NER module 962 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 960 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 964 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 962 may search the database of generic words associated with the domain (in the NLU's storage 972). For instance, if the query was "play songs by the rolling stones," after failing to determine an album name or song name called "songs" by "the rolling stones," the NER 962 may search the domain vocabulary for the word "songs." In the alternative, generic words may be checked before the gazetteer information, or both may be tried, potentially producing two different results.

The comparison process used by the NER module 962 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module 962 may also use contextual operational rules to fill slots. For example, if a user had previously requested to pause a particular song and thereafter requested that the voice-controlled device "please un-pause my music," the NER module 962 may apply an inference-based rule to fill a slot associated with the name of the song that the user currently wishes to play—namely the song that was playing at the time the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 990, which may be located on a same or separate server(s) 112 as part of the system 100. The destination command processor 990 may be determined based on the NLU output. For example, if the NLU output includes a command to play music, the destination command processor 990 may be a music playing application, such as one located on device 102 or in a music playing appliance, configured to execute a music playing command. If the NLU output includes a search query (for example, requesting the return of search results), the destination command processor 990 may include a search engine processor, such as one located on a search server, configured to execute a search command and determine search results, which may include output text to be processed by a TTS engine and output from a device as synthesized speech, such as announcements made with the pages described above.

Figure 10:
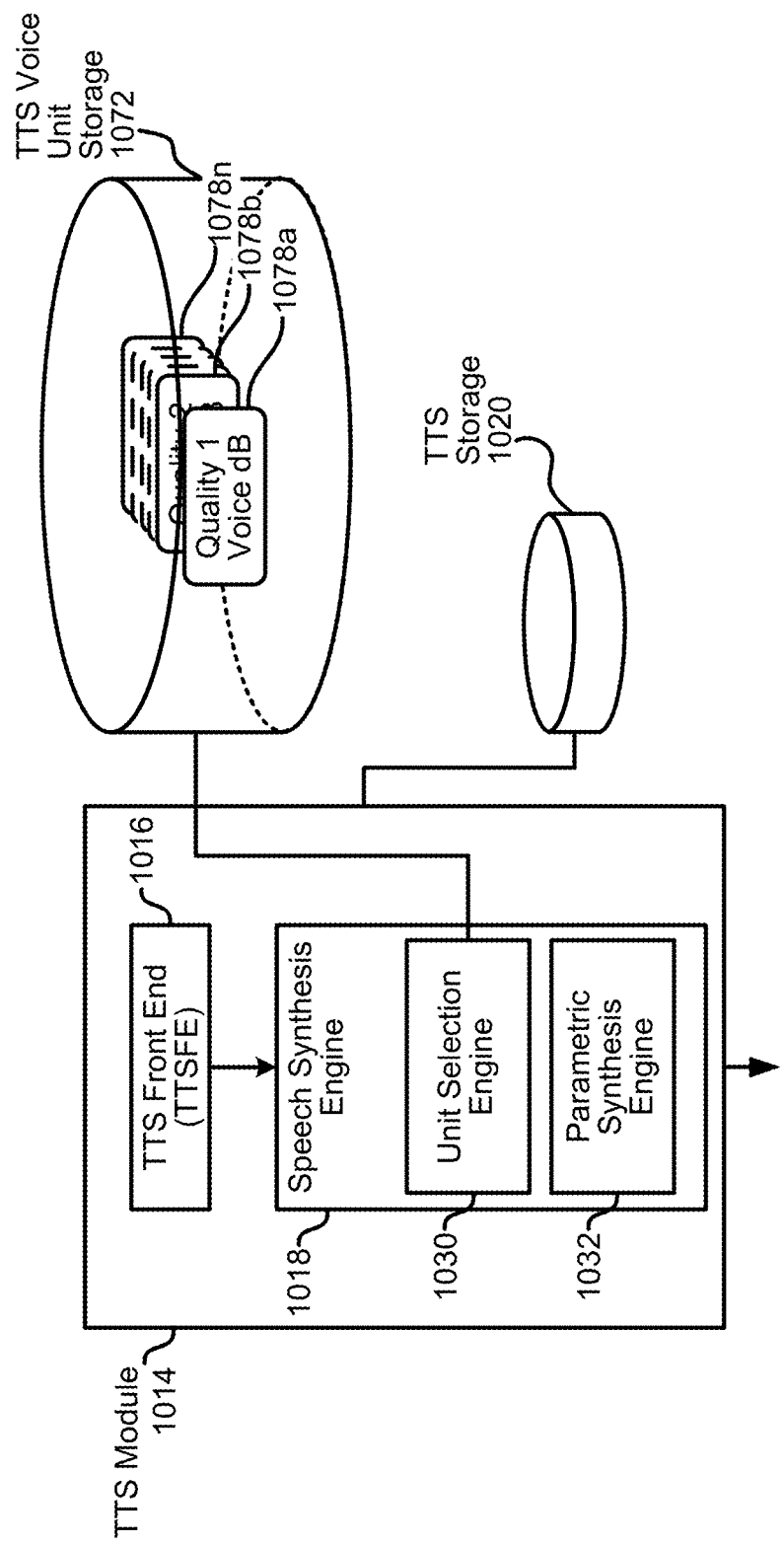
FIG. 10 illustrates an example of generating text-to-speech (TTS) or synthesized speech according to examples of the present disclosure.

FIG. 10 illustrates an example of generating text-to-speech (TTS) or synthesized speech according to examples of the present disclosure. The TTS module/processor 1014 includes a TTS front end (TTSFE) 1016, a speech synthesis engine 1018, and TTS storage 1020. The TTSFE 1016 transforms input text data (for example from command processor 990) into a symbolic linguistic representation for processing by the speech synthesis engine 1018. The TTSFE 1016 may also process tags or other data input to the TTS module that indicate how specific words should be pronounced (e.g., an indication that a word is an interjection). The speech synthesis engine 1018 compares the annotated phonetic units models and information stored in the TTS storage 1020 for converting the input text into speech. The TTSFE 1016 and speech synthesis engine 1018 may include their own controller(s)/processor(s) and memory or they may use the controller/processor and memory 1010 of the server(s) 112, device 102, or other device, for example. Similarly, the instructions for operating the TTSFE 1016 and speech synthesis engine 1018 may be located within the TTS module 1014, within the memory and/or storage of the server(s) 112, device 102, or within an external device.

Text input into a TTS module 1014 may be sent to the TTSFE 1016 for processing. The front-end may include modules for performing text normalization, linguistic analysis, and linguistic prosody generation. During text normalization, the TTSFE processes the text input and generates standard text, converting such things as numbers, abbreviations (such as Apt., St., etc.), symbols ($, %, etc.) into the equivalent of written out words.

During linguistic analysis the TTSFE 1016 analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. A TTS module 1014 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage module 1020. The linguistic analysis performed by the TTSFE 1016 may also identify different grammatical components such as prefixes, suffixes, phrases, punctuation, syntactic boundaries, or the like. Such grammatical components may be used by the TTS module 1014 to craft a natural sounding audio waveform output. The language dictionary may also include letter-to-sound rules and other tools that may be used to pronounce previously unidentified words or letter combinations that may be encountered by the TTS module 1014. Generally, the more information included in the language dictionary, the higher quality the speech output.

Based on the linguistic analysis the TTSFE 1016 may then perform linguistic prosody generation where the phonetic units are annotated with desired prosodic characteristics, also called acoustic features, which indicate how the desired phonetic units are to be pronounced in the eventual output speech. During this stage the TTSFE 1016 may consider and incorporate any prosodic annotations that accompanied the text input to the TTS module 1014. Such acoustic features may include pitch, energy, duration, and the like. Application of acoustic features may be based on prosodic models available to the TTS module 1014. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTSFE 1016, referred to as a symbolic linguistic representation, may include a sequence of phonetic units annotated with prosodic characteristics. This symbolic linguistic representation may be sent to a speech synthesis engine 1018, also known as a synthesizer, for conversion into an audio waveform of speech for output to an audio output device and eventually to a user. The speech synthesis engine 1018 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 1018 may perform speech synthesis using one or more different methods. In one method of synthesis called unit selection, described further below, a unit selection engine 1030 matches the symbolic linguistic representation created by the TTSFE 1016 against a database of recorded speech, such as a database of a voice corpus. The unit selection engine 1030 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 1030 may match units to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 1032, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS module 1014 may include an acoustic model, or other models, which may convert a symbolic linguistic representation into a synthetic acoustic waveform of the text input based on audio signal manipulation. The acoustic model includes rules which may be used by the parametric synthesis engine 1032 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 1016.

The parametric synthesis engine 1032 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1018, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Unit selection speech synthesis may be performed as follows. Unit selection includes a two-step process. First a unit selection engine 1030 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 1030. As part of unit selection, the unit selection engine 1030 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 1020, in storage 1012, or in another storage component. For example, different unit selection databases may be stored in TTS voice unit storage 1072. Each speech unit database includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1018 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Audio waveforms including the speech output from the TTS module 1014 may be sent to an audio output component, such as a speaker for playback to a user or may be sent for transmission to another device, such as another server(s) 112, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS module 1014 may be configured to perform TTS processing in multiple languages. For each language, the TTS module 1014 may include specially configured data, instructions and/or components to synthesize speech in the desired language(s). To improve performance, the TTS module 1014 may revise/update the contents of the TTS storage 1020 based on feedback of the results of TTS processing, thus enabling the TTS module 1014 to improve speech recognition.

Other information may also be stored in the TTS storage 1020 for use in speech recognition. The contents of the TTS storage 1020 may be prepared for general TTS use or may be customized to include sounds and words that are likely to be used in a particular application. For example, for TTS processing by a global positioning system (GPS) device, the TTS storage 1020 may include customized speech specific to location and navigation. In certain instances the TTS storage 1020 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic(s) (such as speaking an interjection in an enthusiastic manner) as explained in other sections herein. The speech synthesis engine 1018 may include specialized databases or models to account for such user preferences.

For example, to create the customized speech output of the system, the system may be configured with multiple voice corpuses/unit databases 1078a-1078n, where each unit database is configured with a different "voice" to match desired speech qualities. The voice selected by the TTS module 1014 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterance may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice corpuses 1078 may then be used during runtime to perform unit selection to synthesize speech having a speech quality corresponding to the input speech quality.

Figure 11:
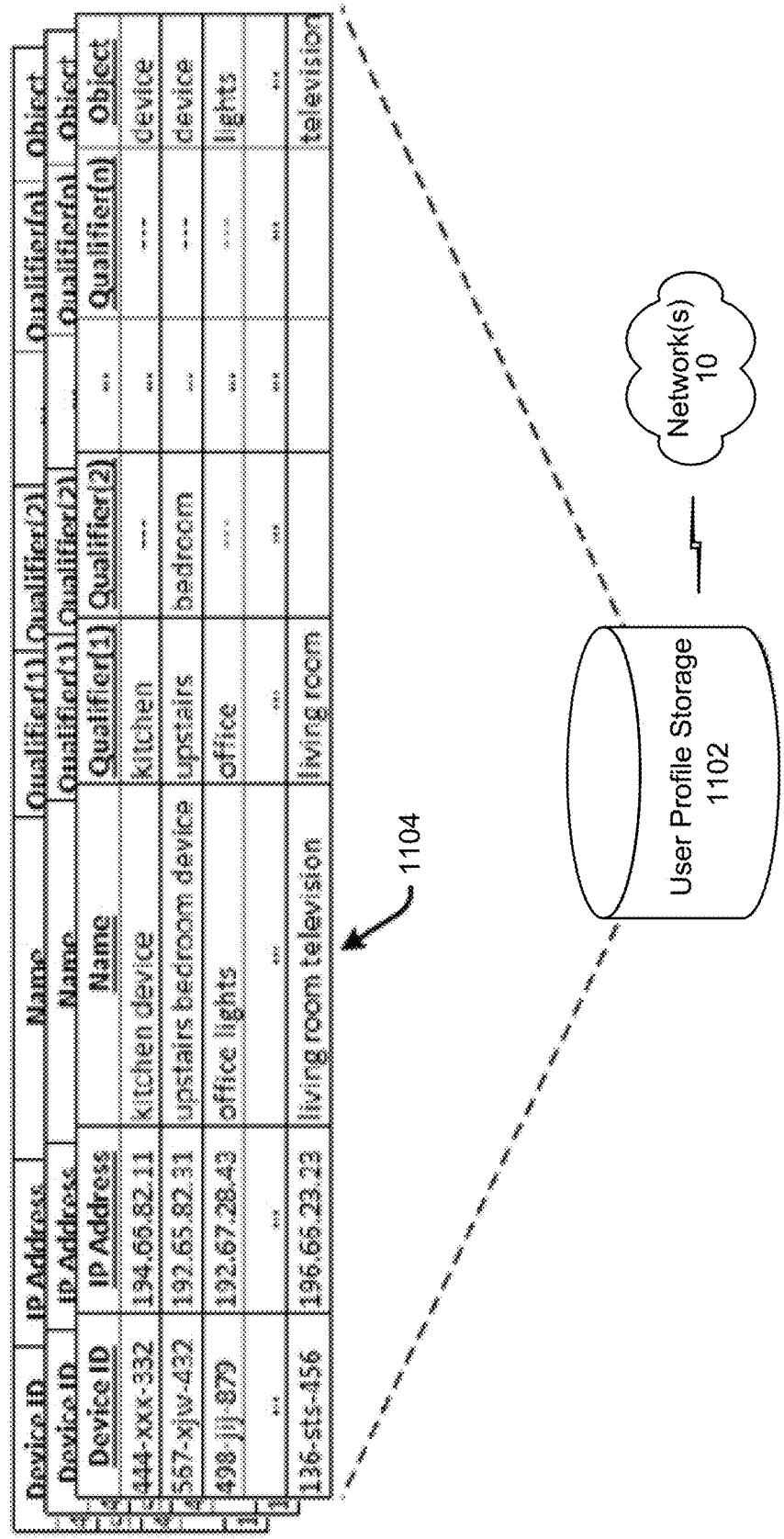
FIG. 11 illustrates data stored and associated with user profiles according to embodiments of the present disclosure.

The server(s) 112 may include or refer to data regarding user accounts, shown by the user profile storage 1102 illustrated in FIG. 11. The user profile storage 1102 may be located proximate to server(s) 112, or may otherwise be in communication with various components, for example over network(s) 10. The user profile storage 1102 may include a variety of information related to individual users, households, accounts, etc. that interact with the system 100. For illustration, as shown in FIG. 11, the user profile storage 1102 may include data regarding the devices associated with particular individual user accounts 1104. In an example, the user profile storage 1102 is a cloud-based storage. Such data may include device identifier (ID) and internet protocol (IP) address information for different devices as well as names by which the devices may be referred to by a user. Further qualifiers describing the devices may also be listed along with a description of the type of object of the device.

Further, the user account 1104 may include or be associated with different user preferences, such as listing pages of content, preferred transition timing, messaging preferences, favorite contacts, important events and/or other preferences associated with the pages of content. A device 102 may refer to the user account 1104 and corresponding data (e.g., user preferences) in order to configure settings for an individual user of the device 102.

Figure 12:
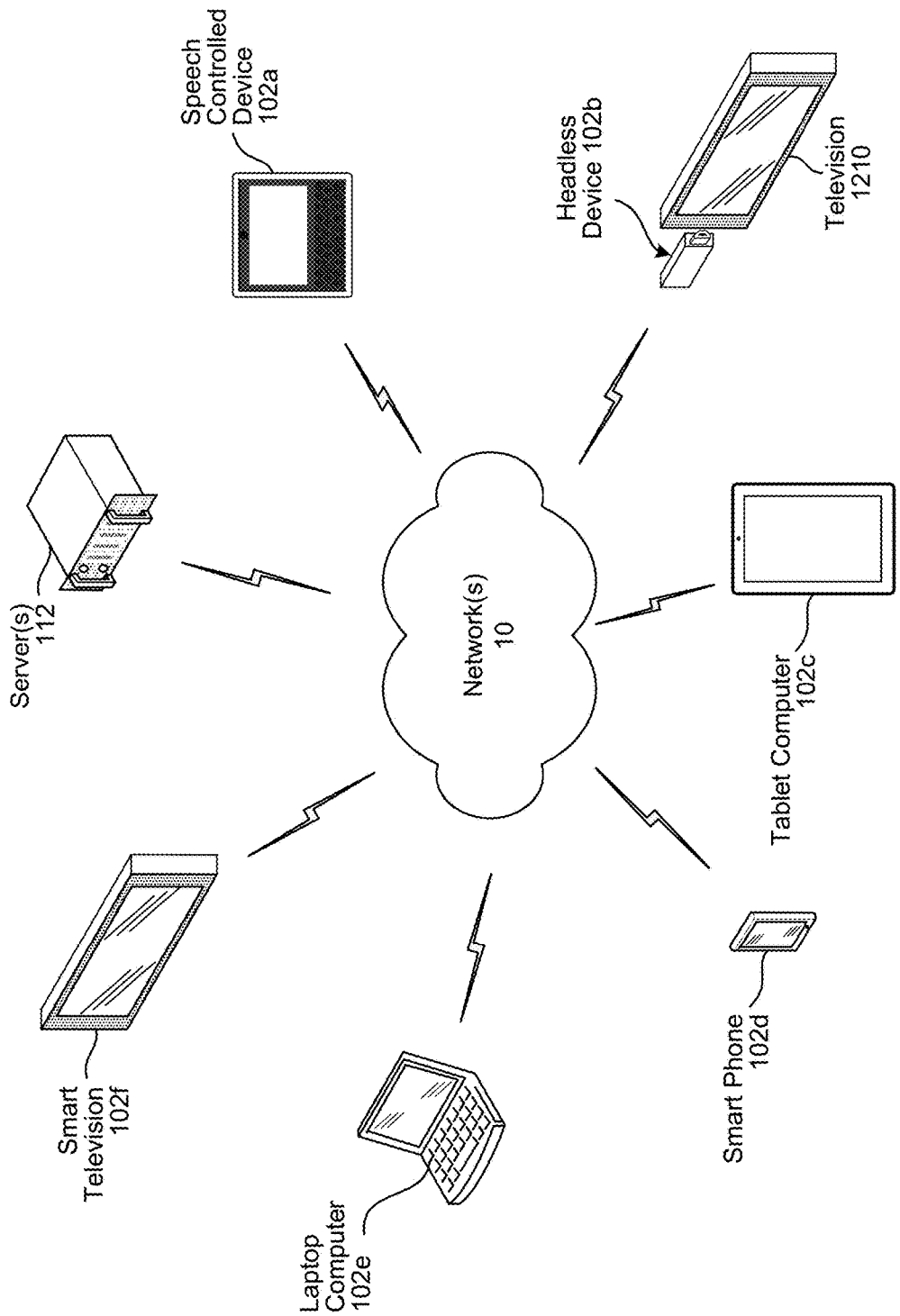
FIG. 12 illustrates an example of a computer network for use with the system.

As illustrated in FIG. 12 devices 102 may contain components of the system 100 and may be connected over network(s) 10. The network(s) 10 may be a local or private network or may be part of a wider network. For example, the network(s) 10 may include a wired local area network (LAN), a wireless local area network (WLAN) (such as WiFi), Bluetooth, and/or wireless network, such as a Long Term Evolution (LTE) network, WiMAX network, 3G network, etc.

Devices 102 may be connected to the network(s) 10 through either wired or wireless connections. For example, a speech controlled device 102a, a headless device 102b connected to a television 1210, a tablet computer 102c, a smart phone 102d, a laptop computer 102e, and/or a smart television 102f, may be connected to the network(s) 10 through a wired and/or wireless connection. Thus, while the examples illustrated above are directed to the speech-controlled device 102a with the display 104, the disclosure is not limited thereto and the device 102 may be any device including a display and capable of receiving far-field input from a user. For example, the smart television 102f may include a camera 106, microphone(s) 108 and/or speakers 110 and may display pages of content to the user.

While the examples described herein illustrate the device 102 performing multiple functions, the disclosure is not limited thereto. Instead, the server(s) 112 may perform any of the functions described herein without departing from the disclosure. For example, the server(s) 112 may assist the device 102 with Automatic Speech Recognition (ASR) processing, Natural Language Understanding (NLU) processing, command processing, determining relevant content, generating display data and/or generating synthesized speech. A single server 112 may be capable of performing all speech processing or multiple server(s) 112 may combine to perform the speech processing. In addition, certain speech detection or command execution functions may be performed by device 102. Thus, the device 102 and/or the server(s) 112 may perform the functions described herein without departing from the disclosure. In a first example, the device 102 may determine relevant data, generate display data corresponding to the relevant data and generate synthesized speech corresponding to the display data. In a second example, the server(s) 112 may determine the relevant data, generate the display data, generate the synthesized speech, cause the display data to be displayed and/or cause audio corresponding to the synthesized speech to be output. Thus, the device 102 may receive the relevant data, the display data and/or the synthesized speech from the server(s) 112 and display the display data and/or output the audio.

FIG. 13A is a block diagram conceptually illustrating a local device 102 that may be used with the described system 100. FIG. 13B is a block diagram conceptually illustrating example components of a remote device, such as a remote server(s) 112 that may assist with Automatic Speech Recognition (ASR), Natural Language Understanding (NLU) processing, command processing, determining relevant content, generating display data and/or generating synthesized speech. Multiple such server(s) 112 may be included in the system, such as one server(s) 112 for ASR, one server(s) 112 for NLU, etc.

While the examples described above illustrate the device 102 performing multiple functions, the disclosure is not limited thereto and the server(s) 112 may perform any of the functions described above without departing from the disclosure. For example, the server(s) 112 may assist the device 102 with ASR processing, NLU processing, command processing, determining relevant content, generating display data and/or generating synthesized speech. In a first example, the device 102 may determine relevant data, generate display data corresponding to the relevant data and generate synthesized speech corresponding to the display data. In a second example, the server(s) 112 may determine the relevant data, generate the display data, generate the synthesized speech, cause the display data to be displayed and/or cause audio corresponding to the synthesized speech to be output. Thus, the device 102 may receive the relevant data, the display data and/or the synthesized speech from the server(s) 112 and display the display data and/or output the audio.

In operation, the system 100 may include computer-readable and computer-executable instructions that reside on the device 102 and/or server(s) 112, as will be discussed further below. The device 102 may be an electronic device capable of generating and/or displaying content. Examples of electronic devices may include computers (e.g., a desktop, a laptop, a server or the like), portable devices (e.g., a camera (such as a 360° video camera, a security camera, a mounted camera, a portable camera or the like), smart phone, tablet or the like), media devices (e.g., televisions, video game consoles or the like) or the like. The device 102/server(s) 112 may also be a component of any of the abovementioned devices or systems.

As illustrated in FIGS. 13A-13B, the device 102/server(s) 112 may include an address/data bus 1302 for conveying data among components of the device 102/server(s) 112. Each component within the device 102/server(s) 112 may also be directly connected to other components in addition to (or instead of) being connected to other components across the bus 1302.

The device 102/server(s) 112 may include one or more controllers/processors 1304, that may each include a central processing unit (CPU) for processing data and computer-readable instructions, and a memory 1306 for storing data and instructions. The memory 1306 may include volatile random access memory (RAM), non-volatile read only memory (ROM), non-volatile magnetoresistive (MRAM) and/or other types of memory. The device 102/server(s) 112 may also include a data storage component 1308, for storing data and controller/processor-executable instructions (e.g., instructions to perform the algorithm illustrated in FIG. 1). The data storage component 1308 may include one or more non-volatile storage types such as magnetic storage, optical storage, solid-state storage, etc. The device 102/server(s) 112 may also be connected to removable or external non-volatile memory and/or storage (such as a removable memory card, memory key drive, networked storage, etc.) through the input/output device interfaces 1310.

The device 102/server(s) 112 includes input/output device interfaces 1310. A variety of components may be connected through the input/output device interfaces 1310, such as camera 106, microphone(s) 108 and/or speakers 110 connected to the device 102. However, the disclosure is not limited thereto and the device 102 may not include an integrated camera 106, microphone(s) 108 or speakers 110. Thus, the camera 106, microphone(s) 108, speakers 110 and/or other components may be integrated into the device 102 or may be separate from the device 102/server(s) 112 without departing from the disclosure. In some examples, the device 102 may include an inertial measurement unit (IMU), gyroscope, accelerometers or other component configured to provide motion data or the like associated with the device 102. If an array of microphones 108 is included, approximate distance to a sound's point of origin may be performed acoustic localization based on time and amplitude differences between sounds captured by different microphones of the array. The device 102 (using microphone 108, wakeword detection module 920, ASR module 950, etc.) may be configured to determine audio data corresponding to detected audio. The device 102 (using input/output device interfaces 1310, etc.) may also be configured to transmit the audio data to server(s) 112 for further processing or to process the data using internal components such as a wakeword detection module 920.

The input/output device interfaces 1310 may be configured to operate with network(s) 10, for example a wireless local area network (WLAN) (such as WiFi), Bluetooth, ZigBee and/or wireless networks, such as a Long Term Evolution (LTE) network, WiMAX network, 3G network, etc. The network(s) 10 may include a local or private network or may include a wide network such as the internet. Devices may be connected to the network 1320 through either wired or wireless connections.

The input/output device interfaces 1310 may also include an interface for an external peripheral device connection such as universal serial bus (USB), FireWire, Thunderbolt, Ethernet port or other connection protocol that may connect to network(s) 10. The input/output device interfaces 1310 may also include a connection to an antenna (not shown) to connect one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102 and/or the server(s) 112 may include a wakeword detection module 920, an automatic speech recognition (ASR) 950, a natural language understanding (NLU) 960, a command processor 990 and/or a text-to-speech (TTS) module 1014 as described above with regard to FIGS. 9-10.

The ASR module 950 in device 102 may be of limited or extended capabilities. The ASR module 950 may include the language models 954 stored in ASR model storage component 952, and an ASR module 950 that performs the automatic speech recognition process. If limited speech recognition is included, the ASR module 950 may be configured to identify a limited number of words, such as keywords detected by the device, whereas extended speech recognition may be configured to recognize a much larger range of words.

The device 102 and/or server(s) 112 may include a limited or extended NLU module 960. The NLU module in device 102 may be of limited or extended capabilities. The NLU module 960 may comprise the name entity recognition module 962, the intent classification module 964 and/or other components. The NLU module 960 may also include a stored knowledge base and/or entity library, or those storages may be separately located.

The device 102 and/or server(s) 112 may also include a command processor 990 that is configured to execute commands/functions associated with a spoken command as described above.

The device 102 may include a wakeword detection module 920, which may be a separate component or may be included in an ASR module 950. The wakeword detection module 920 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

The wakeword detection module 920 receives captured audio and processes the audio (for example, using model(s) 932) to determine whether the audio corresponds to particular keywords recognizable by the device 102 and/or system 100. The storage 1308 may store data relating to keywords and functions to enable the wakeword detection module 920 to perform the algorithms and methods described above. The locally stored speech models may be preconfigured based on known information, prior to the device 102 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 102 prior to the user device 102 being delivered to the user or configured to access the network by the user. The wakeword detection module 920 may access the storage 1308 and compare the captured audio to the stored models and audio sequences using audio comparison, pattern recognition, keyword spotting, audio signature, and/or other audio processing techniques.

In some examples, the device 102 may not include the ASR 950, the NLU 960, the command processor 990 and/or the TTS module 1014. Instead, the server(s) 112 may include these components and may receive audio input, perform ASR/NLU on the audio input to determine a command, determine relevant data, generate display data and/or generate synthesized speech. Thus, the device 102 may receive data and/or instructions from the server(s) 112 to perform functionality associated with the ASR 950, the NLU 960, the command processor 990 and/or the TTS module 1014. Additionally or alternatively, in some examples the server(s) 112 may not include the wakeword detection module 920.

The device 102/server(s) 112 further includes a notification module 1324, which may comprise processor-executable instructions stored in storage 1308 to be executed by controller(s)/processor(s) 1304 (e.g., software, firmware, hardware, or some combination thereof). For example, components of the notification module 1324 may be part of a software application running in the foreground and/or background on the device 102/server(s) 112. The notification module 1324 may control the device 102/server(s) 112 as discussed above, for example with regard to FIG. 1. Some or all of the controllers/modules of the notification module 1324 may be executable instructions that may be embedded in hardware or firmware in addition to, or instead of, software. In one embodiment, the device 102/server(s) 112 may operate using an Android operating system (such as Android 4.3 Jelly Bean, Android 4.4 KitKat or the like), an Amazon operating system (such as FireOS or the like), or any other suitable operating system.

Executable computer instructions for operating the device 102/server(s) 112 and its various components may be executed by the controller(s)/processor(s) 1304, using the memory 1306 as temporary "working" storage at runtime. The executable instructions may be stored in a non-transitory manner in non-volatile memory 1306, storage 1308, or an external device. Alternatively, some or all of the executable instructions may be embedded in hardware or firmware in addition to or instead of software.

The components of the device 102/server(s) 112, as illustrated in FIGS. 13A-13B, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   determining first content associated with a first feature group of a plurality of feature groups;
   determining second content associated with a second feature group of the plurality of feature groups;
   determining third content associated with a third feature group of the plurality of feature groups;
   determining relevant content, the relevant content including the first content and third content and not including the second content;
   determining, from the plurality of feature groups, a first portion that includes the relevant content, the first portion including the first feature group and the third feature group;
   determining, from the plurality of feature groups, a second portion that does not include the relevant content, the second portion including the second feature group;
   generating first display data including a first indicator indicating a first position of the first feature group within the first portion;
   generating second display data including a second indicator indicating a second position of the third feature group within the first portion;
   causing the first display data to be displayed; and
   causing the second display data to be displayed after causing the first display data to be displayed.

2. The computer-implemented method of claim 1, further comprising:
   generating first synthesized speech corresponding to the first display data;
   outputting, while displaying the first display data, first audio corresponding to the first synthesized speech;
   generating second synthesized speech corresponding to the second display data; and
   outputting, while displaying the second display data, second audio corresponding to the second synthesized speech.

3. The computer-implemented method of claim 1, further comprising:
   receiving a first input to cause the second display data to be displayed;
   determining that no additional input has been received for a first period of time after receiving the first input;
   causing, after the second display data is displayed for the first period of time, third display data to be displayed; and
   causing, after the third display data is displayed for a second period of time shorter than the first period of time, fourth display data to be displayed.

4. The computer-implemented method of claim 1, further comprising:
   displaying the first display data;
   receiving a first input to run a first process;
   starting the first process; and
   displaying third display data corresponding to the first process.

5. The computer-implemented method of claim 1, wherein the determining relevant content further comprises:
   determining an identity of a person in proximity to a display;
   determining at least one of a first time associated with receiving the first content and a second time indicated by the first content; and
   determining that the first content is included in the relevant content based on at least one of the first time, the second time and the identity.

6. The computer-implemented method of claim 1, further comprising:
   causing the first display data to be displayed for a first period of time;
   causing, after the first display data is displayed for the first period of time, the second display data to be displayed; and
   determining that display data for each of the feature groups included in the first portion has been displayed for at least the first period of time.

7. The computer-implemented method of claim 1, further comprising:
   determining that a first person is in proximity to a device;
   determining that additional people are not in proximity to the device;
   determining a first identity of the first person; and
   determining the relevant content based on the first identity using first privacy settings.

8. The computer-implemented method of claim 7, further comprising:
   determining that a second person is in proximity to the device in addition to the first person;
   determining a second identity of the second person; and
   determining the relevant content based on the first identity and the second identity using second privacy settings that are more restrictive than the first privacy settings.

9. A device, comprising:
   at least one processor;
   memory including instructions operable to be executed by the at least one processor to cause the device to:
      determine first content associated with a first feature group of a plurality of feature groups;
      determine second content associated with a second feature group of the plurality of feature groups;
      determine third content associated with a third feature group of the plurality of feature groups;
      determine relevant content, the relevant content including the first and third content and not including the second content;
      determine, from the plurality of feature groups, a first portion that includes the relevant content, the first portion including the first feature group and the third feature group;

determine, from the plurality of feature groups, a second portion that does not include the relevant content, the second portion including the second feature group;

generate first display data including a first indicator indicating a first position of the first feature group within the first portion;

generate second display data including a second indicator indicating a second position of the third feature group within the first portion;

cause the first display data to be displayed; and cause the second display data to be displayed after causing the first display data to be displayed.

10. The device of claim 9, wherein the memory further comprises instructions that, when executed by the at least one processor, further cause the device to:

generate first synthesized speech corresponding to the first display data;

output, while displaying the first display data, first audio corresponding to the first synthesized speech;

generate second synthesized speech corresponding to the second display data; and output, while displaying the second display data, second audio corresponding to the second synthesized speech.

11. The device of claim 9, wherein the memory further comprises instructions that, when executed by the at least one processor, further cause the device to:

receive a first input to cause the second display data to be displayed;

determine that no additional input has been received for a first period of time after receiving the first input;

cause, after the second display data is displayed for the first period of time, third display data to be displayed; and cause, after the third display data is displayed for a second period of time shorter than the first period of time, fourth display data to be displayed.

12. The device of claim 9, wherein the memory further comprises instructions that, when executed by the at least one processor, further cause the device to:

display the first display data;

receive a first input to run a first process;

start the first process; and display third display data corresponding to the first process.

13. The device of claim 9, wherein the memory further comprises instructions that, when executed by the at least one processor, further cause the device to:

determine an identity of a person in proximity to a display;

determine at least one of a first time associated with receiving the first content and a second time indicated by the first content; and determine that the first content is included in the relevant content based on at least one of the first time, the second time and the identity.

14. The device of claim 9, wherein the memory further comprises instructions that, when executed by the at least one processor, further cause the device to:

cause the first display data to be displayed for a first period of time;

cause, after the first display data is displayed for the first period of time, the second display data to be displayed; and determine that display data for each of the feature groups included in the first portion has been displayed for at least the first period of time.

15. The device of claim 9, wherein the memory further comprises instructions that, when executed by the at least one processor, further cause the device to:

determine that a first person is in proximity to the device;

determine that additional people are not in proximity to the device;

determine a first identity of the first person; and determine the relevant content based on the first identity using first privacy settings.

16. The device of claim 15, wherein the memory further comprises instructions that, when executed by the at least one processor, further cause the device to:

determine that a second person is in proximity to the device in addition to the first person;

determine a second identity of the second person; and determine the relevant content based on the first identity and the second identity using second privacy settings that are more restrictive than the first privacy settings.

* * * * *